US012675199B1

(12) United States Patent
Alameh et al.

(10) Patent No.: US 12,675,199 B1
(45) Date of Patent: Jul. 7, 2026

(54) SYSTEM AND METHOD FOR ORCHESTRATING CAPACITIVE TOUCH INPUT SENSORS AT TOP AND SIDE SURFACES OF AN INFORMATION HANDLING SYSTEM BASE CHASSIS FOR COMPUTING DEVICE CONTROL BASED ON CONFIGURATIONAL POSITION

(71) Applicant: Dell Products LP, Round Rock, TX (US)

(72) Inventors: Rachid M. Alameh, Crystal Lake, IL (US); Jarrett Simerson, Northbrook, IL (US); Erik Summa, Lockhart, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 19/288,229

(22) Filed: Aug. 1, 2025

(51) Int. Cl.
G06F 3/044 (2006.01)
G06F 1/16 (2006.01)
G06F 3/0354 (2013.01)
G06F 3/041 (2006.01)
G06F 3/16 (2006.01)

(52) U.S. Cl.
CPC ........ G06F 3/0445 (2019.05); G06F 3/03547 (2013.01); G06F 3/0412 (2013.01); G06F 3/04166 (2019.05); G06F 3/165 (2013.01); G06F 1/1677 (2013.01); G06F 2203/04107 (2013.01)

(58) Field of Classification Search
CPC .. G06F 3/0445; G06F 3/03547; G06F 3/0412; G06F 3/04166; G06F 3/165; G06F 1/1677; G06F 2203/04107
See application file for complete search history.

(56) References Cited

U.S. PATENT DOCUMENTS 6,943,705 B1 * 9/2005 Bolender .............. G06F 3/0445
200/600
7,088,343 B2 * 8/2006 Smith ................... G06F 1/1616
345/173
8,325,141 B2 * 12/2012 Marsden ................ G06F 3/023
345/168

(Continued)

FOREIGN PATENT DOCUMENTS

WO 2016/111876 A1 7/2016

*Primary Examiner* — Michael J Jansen, II
(74) *Attorney, Agent, or Firm* — Prol Intellectual Property Law, PLLC; H. Kenneth Prol

(57) ABSTRACT

An information handling system operating capacitive sensor pads based on chassis orientation may comprise a touch input sensing hardware structure including top and side capacitive sensor pads formed under a base chassis exterior touch input top surface and internal to a base chassis sidewall input surface, respectively, each with a grounding layer and active shielding layer. A capacitive sensor microprocessor operably coupled to the top and side capacitive sensor pads executing machine readable code instructions to disable the side capacitive sensor pads when a chassis positional configuration sensor detects that the clamshell chassis is in an open configuration and to disable the top capacitive sensor pads when the clam shell chassis is in a closed configuration to adjust detection of a capacitive change from user interaction with the base chassis for identifying a user input of an input/output command for an input/output device.

20 Claims, 10 Drawing Sheets

(56) References Cited

U.S. PATENT DOCUMENTS

| | | | | |
|---|---|---|---|---|
| 8,379,060 | B2 * | 2/2013 | Kwong | G09G 5/02 |
| | | | | 345/589 |
| 8,674,941 | B2 * | 3/2014 | Casparian | H01H 13/85 |
| | | | | 345/156 |
| 8,735,755 | B2 * | 5/2014 | Peterson | H03K 17/98 |
| | | | | 200/600 |
| 9,013,453 | B2 * | 4/2015 | van Lieshout | G06F 3/047 |
| | | | | 345/174 |
| 9,600,119 | B2 * | 3/2017 | Hsu | G06F 1/1643 |
| 9,638,731 | B2 * | 5/2017 | Hu | G06F 3/0202 |
| 10,871,828 | B2 * | 12/2020 | Ligtenberg | G06F 3/04144 |
| 10,884,564 | B2 * | 1/2021 | Yoshida | G06K 19/07756 |
| 11,086,463 | B2 * | 8/2021 | Krah | G06F 1/1643 |
| 11,385,744 | B2 * | 7/2022 | Liu | G06F 3/044 |
| 11,817,275 | B2 | 11/2023 | Wang et al. | |
| 12,013,741 | B2 * | 6/2024 | Chen | G06F 3/0412 |
| 12,299,225 | B2 * | 5/2025 | Komatsu | H10N 30/857 |
| 2002/0158838 | A1 * | 10/2002 | Smith | G06F 1/1684 |
| | | | | 345/156 |
| 2005/0162402 | A1 * | 7/2005 | Watanachote | G06F 3/0416 |
| | | | | 345/173 |
| 2007/0199804 | A1 | 8/2007 | Joseph et al. | |
| 2009/0073128 | A1 | 3/2009 | Marsden | |
| 2009/0160878 | A1 * | 6/2009 | Kwong | G09G 5/02 |
| | | | | 345/690 |
| 2011/0102326 | A1 | 5/2011 | Casparian et al. | |
| 2012/0228111 | A1 | 9/2012 | Peterson et al. | |
| 2013/0113761 | A1 * | 5/2013 | van Lieshout | G06F 3/0444 |
| | | | | 345/178 |
| 2014/0062684 | A1 | 3/2014 | Casparian et al. | |
| 2014/0097857 | A1 | 4/2014 | Hu | |
| 2014/0224633 | A1 | 8/2014 | Peterson et al. | |
| 2015/0097783 | A1 * | 4/2015 | Hsu | G06F 3/0418 |
| | | | | 345/173 |
| 2016/0195955 | A1 | 7/2016 | Picciotto et al. | |
| 2018/0217668 | A1 | 8/2018 | Ligtenberg et al. | |
| 2018/0217669 | A1 | 8/2018 | Ligtenberg et al. | |
| 2018/0218859 | A1 | 8/2018 | Ligtenberg et al. | |
| 2019/0102004 | A1 * | 4/2019 | Krah | G06F 3/0412 |
| 2020/0257408 | A1 * | 8/2020 | Yoshida | G06K 19/07756 |
| 2020/0278747 | A1 | 9/2020 | Ligtenberg et al. | |
| 2021/0165513 | A1 | 6/2021 | Liu et al. | |
| 2021/0407748 | A1 | 12/2021 | Wang et al. | |
| 2022/0326777 | A1 | 10/2022 | Ligtenberg et al. | |
| 2023/0280857 | A1 * | 9/2023 | Komatsu | H10N 30/302 |
| | | | | 345/173 |
| 2023/0280864 | A1 * | 9/2023 | Chen | G06F 1/3296 |
| | | | | 345/174 |
| 2023/0333658 | A1 | 10/2023 | Ligtenberg et al. | |
| 2024/0047156 | A1 | 2/2024 | Wang et al. | |
| 2024/0411403 | A1 * | 12/2024 | Matsuda | G06F 3/0446 |
| 2025/0044874 | A1 | 2/2025 | Ligtenberg et al. | |
| 2025/0370571 | A1 * | 12/2025 | Huang | G06F 3/0421 |
| 2026/0010263 | A1 * | 1/2026 | Huang | G06F 3/04186 |
| 2026/0029821 | A1 * | 1/2026 | Ding | G06F 1/1641 |

* cited by examiner

SYSTEM AND METHOD FOR ORCHESTRATING CAPACITIVE TOUCH INPUT SENSORS AT TOP AND SIDE SURFACES OF AN INFORMATION HANDLING SYSTEM BASE CHASSIS FOR COMPUTING DEVICE CONTROL BASED ON CONFIGURATIONAL POSITION

FIELD OF THE DISCLOSURE

The present disclosure generally relates to a system and method for detecting human input via contactless capacitive sensing of user input for computing device controls at a keyboard or touch input surface on various portions of an information handling system chassis. The present disclosure more specifically relates systems and methods for activating or deactivating capacitive sensor pads with user input for computing device controls sensing capacitive changes at either a base chassis exterior touch input top surface or a base chassis sidewall input surface based on a configurational position (e.g., open or closed) of a clamshell chassis housing for an information handling system.

BACKGROUND

As the value and use of information continues to increase, individuals and businesses seek additional ways to process and store information. One option available are information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more workspace productivity applications such as for teleconferencing, word processing, sales systems, business software, gaming applications, or the like. In some embodiments, a user interface via a keyboard or other input/output (IO) may be used with an information handling system for access and input commands.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
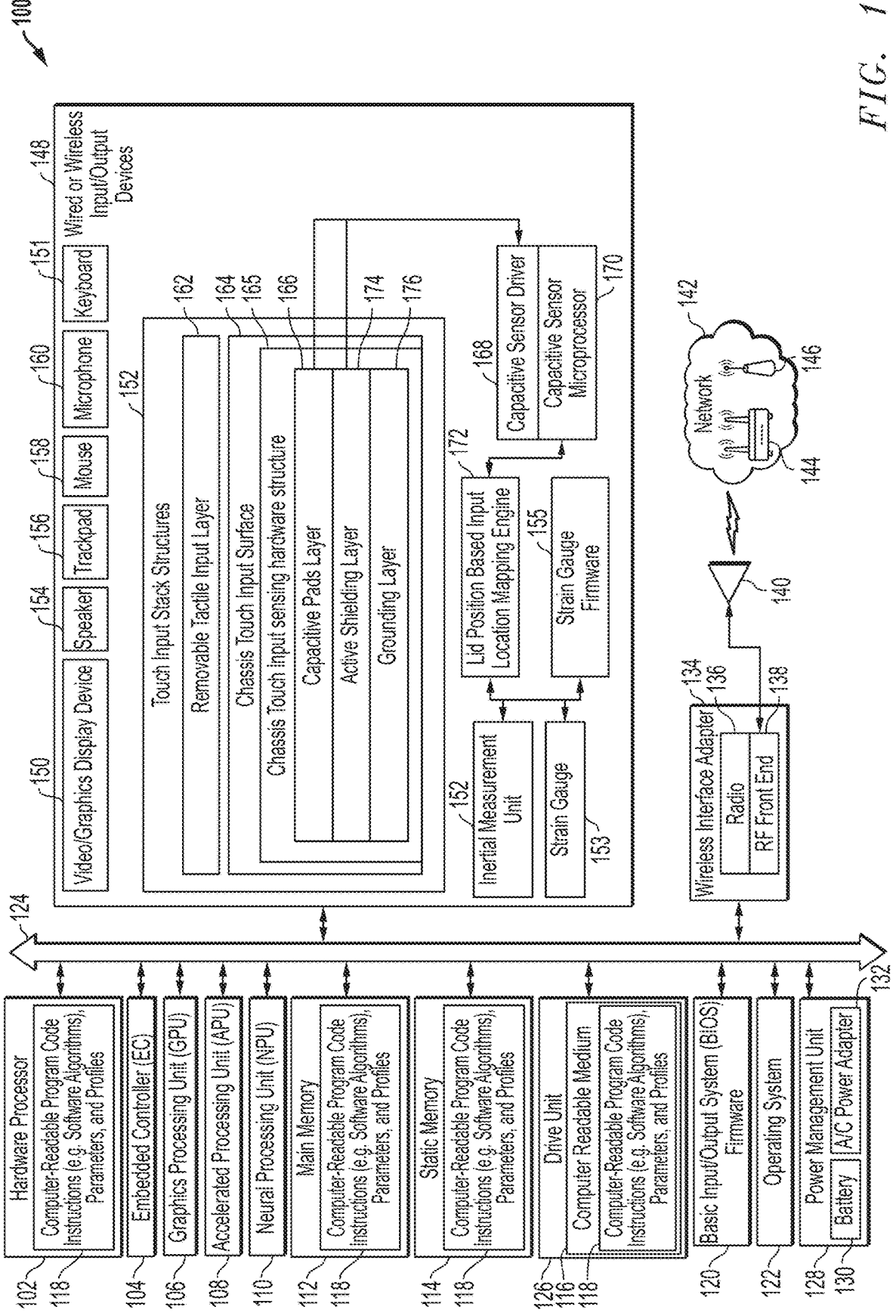
FIG. 1 is a block diagram illustrating an information handling system that includes a touch input stack structure having a chassis touch input surface and a separate chassis touch input sensing hardware structure sealed within the information handling system chassis to receive user touch and gesture input contactlessly at capacitive sensor pads according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems may include one or more input/output (IO) devices for receiving user input and which may include a keyboard, a touchpad, a gesture sensing device such as a camera or infrared camera among other IO devices. The present disclosure describes an information handling system in a clamshell type chassis, such as a laptop computer, having a base chassis and a display lid chassis. The base chassis houses a keyboard, touchpad, information handling system hardware components, and a touch input sensing hardware structure that senses capacitive changes in capacitive sensor pads disposed beneath the top touch input surface of the base chassis or a base chassis sidewall touch input surface as a user interacts with those chassis touch input surfaces through touch or by hovering a finger or portion of a hand just above those chassis touch input surfaces. In some embodiments, this top base chassis exterior touch input top surface or the base chassis sidewall touch input surface of the base chassis through which the capacitive sensor pads may sense such user touch input may include a base chassis exterior touch input top surface that surrounds a classic mechanical keyboard and touchpad or the sidewalls of the base chassis respectively. In some embodiments, this top base chassis surface may be formed to include a sealed input surface upon which a removable tactile input layer such as an interchangeable keyboard may be disposed, as described herein, and used to sense user touch inputs to a display lid chassis touch input surface in a closed position of the clamshell information handling system chassis in an example embodiment.

In embodiments described herein, capacitive sensor pads may sense capacitive changes to portions of the outer surfaces of the clamshell information handling system chassis, such as the top base chassis exterior touch input top surface or the base chassis sidewall touch input surfaces and even the exterior surface of a display lid chassis touch input surface when the clamshell information handling system chassis is in a closed position, making each of these outer chassis surfaces potential touch input surfaces. By placing such capacitive sensor pads nearby IO devices in the information handling system, such as microphones, speakers, display devices, wireless antennas, or the touchpad, the area around any given IO device on these potential chassis touch input surfaces may provide an intuitive location for touch input to control that specific IO device or for other computing device control of the information handling system. For example, placement of a capacitive sensor pad nearby a microphone for sensing a user tapping or pressing the top base chassis exterior touch input top surface or the base chassis sidewall touch input surface situated nearest the known or marked location of the microphone may provide a location for capacitive sensing user tapping or pressing touch input to mute or unmute the microphone or a swiping touch input to adjust volume of the microphone that is more intuitive to a user than searching for a button or hotkey of a keyboard currently used to control such a microphone. This may also save space otherwise reserved for these buttons or hotkeys in or around the keyboard of the information handling system base chassis that are dedicated to adjusting control of the microphone or control of other IO devices, such as the touchpad, speaker, display device, or wireless antenna, or other in example embodiments.

As described herein, in some embodiments, the top outer surface of the base chassis through which the capacitive sensor pads sealed underneath may sense user touch input may comprise the designated top base chassis exterior touch input top surface of the base chassis and may be any location on the base chassis such as those surface portions that surround a keyboard or a touchpad in the base chassis. In such an embodiment, the base chassis of the information handling system may include a base chassis exterior touch input top surface disposed above a touch input sensing hardware structure formed under and sealed within the base chassis exterior touch input top surface in embodiments herein. This top base chassis exterior touch input top surface may be disposed atop the embedded touch input sensing hardware structure including capacitive sensing technologies with capacitive sensor pads of a capacitive pads layer that detect presence, touch, and movement of user fingers or portions of the user's hands made on or just above the top base chassis exterior touch input top surface in embodiments herein. In further embodiments, the embedded touch input sensing hardware structure disposed beneath the top base chassis exterior touch input top surface may be active when a display lid chassis is in an open position and inactive when the display lid chassis is in a closed position pursuant to execution of machine readable code instructions of a lid position based input location mapping engine.

As described herein, in other embodiments, the sidewall outer surface of the base chassis through which the capacitive sensor pads sealed underneath may sense user touch input may comprise the designated base chassis sidewall touch input surface of the base chassis and may be any location on the base chassis sidewalls. In such an embodiment, the base chassis of the information handling system may include a base chassis sidewall touch input surface disposed externally to a touch input sensing hardware structure formed within the base chassis sidewall touch input surface in embodiments herein. This base chassis sidewall touch input surface may be disposed external to the embedded touch input sensing hardware structure including capacitive sensing technologies with capacitive sensor pads of a capacitive pads layer that detect presence, touch, and movement of user fingers or portions of the user's hands made on or just external to the base chassis sidewall touch input surface in embodiments herein. In further embodiments, the embedded touch input sensing hardware structure external to the base chassis sidewall touch input surface may be active when a display lid chassis is in a closed position and inactive when the display lid chassis is in an open position pursuant to execution of machine readable code instructions of a lid position based input location mapping engine.

As also described herein, in other embodiments, the top surface of the base chassis through which capacitive sensor pads may sense user touch input may be formed as a sealed input surface upon which a removable tactile input layer such as an interchangeable keyboard may be disposed, as described herein. In such an embodiment, a keyboard may be used with a laptop-type information handling system that includes a split keyboard type design with a purely mechanical removable tactile input layer that may include keyboard keys that a user may use to provide input to the laptop-type information handling system. The laptop-type information handling system in the present specification also includes a chassis touch input surface with a chassis touch input sensing hardware structure formed under the chassis touch input surface that is separate from the removable tactile input layer in some embodiments. In both an embodiment with a traditional keyboard and base chassis exterior touch input top surface and in an embodiment with the split keyboard type design, the same capacitive sensing technologies may be used to allow for sensing of user touch or gesture on or nearby a base chassis sidewall (e.g., left wall, right wall, front wall, rear wall) or user touch on a display lid chassis touch input surface with the display lid chassis is in a closed position.

In an embodiment, the touch input sensing hardware structure for the information handling system, which may be a chassis touch input sensing hardware structure, may include a capacitive sensor microprocessor to execute machine readable code instructions of a capacitive sensor driver that detect changes in capacitance from user input at the top base chassis exterior touch input top surface, base chassis sidewall touch input surface, or a display lid chassis touch input surface. For example, capacitive changes may be detected at the capacitive sensor pads of a touch input sensing hardware structure formed and sealed within the base chassis from touch inputs or user gesture inputs at the top base chassis exterior touch input top surface or base chassis sidewall touch input surface in various embodiments.

The information handling system may comprise a hardware processor, a data storage device, and a power management unit (PMU) to provide power to the hardware processor and data storage device. In embodiments herein, the information handling system may include the touch input sensing hardware structure formed under the top base chassis exterior touch input top surface or internal to the base chassis sidewall touch input surface that is operatively coupled to a capacitive sensor microprocessor as well as the hardware processor of the information handling system to receive one or more types of IO input from the user. The top base chassis exterior touch input top surface and base chassis sidewall touch input surface may be used for touch inputs or gesture inputs on or above the top base chassis exterior touch input top surface or beside the base chassis sidewall touch input surface that may be detected by capacitive sensing pads of the touch input sensing hardware structure in embodiments. The touch input sensing hardware structure may include a capacitive pads layer disposed within the base chassis comprising a plurality of capacitive sensor pads to detect capacitive changes proximate to the base chassis exterior touch input top surface or an adjoining base chassis sidewall touch input surface in embodiments. The capacitive sensor pads may be formed of carbon-based conductive deposits on a flexible printed circuit board or on the undersurface of the top base chassis exterior touch input top surface or base chassis sidewall touch input surface of the base chassis.

In an embodiment, the plurality of capacitive sensor pads may be made of a deposited carbon pad directly to the underside of sealed surface of the top of the base chassis in one embodiment. The pads can detect capacitive changes from a touch input at a first capacitive change level, or a presence of a human finger at a second capacitive change level, and plural capacitive sensor pads may detect the presence of motion from the touch input or touchless gesture input of a human finger via moving change in detected capacitance at the deposited carbon pads. The deposited carbon capacitive sensor pads are operatively coupled via a flexible printed circuit board, a printed circuit board, deposited conductive connector traces, or other electrical couplings to the capacitive sensor microprocessor in embodiments. The capacitive sensor microprocessor detects the one or more capacitive change levels associated with disruption of a capacitive field at the capacitive sensor pads indicating a user touch input or a user touchless gesture input at areas of the top base chassis exterior touch input top surfaces or base chassis sidewall touch input surfaces located nearest various IO devices, such as a trackpad, speaker, microphone, display device, or wireless antenna in embodiments herein. In an embodiment, each of the plurality of capacitive sensor pads may be operatively coupled to the capacitive sensor microprocessor executing machine readable code instructions of a capacitive sensor driver that can determine when various capacitive thresholds are reached or multiple capacitive sensor pads are activated that may indicate a user touch input or touch motion or a touchless gesture input on or above the base chassis. In an embodiment, each of the plurality of capacitive sensor pads may be operatively coupled to, for example, the capacitive sensor microprocessor via electrical traces formed on a surface such as a printed circuit board (PCB), a flexible PCB, or via one or more electrical traces deposited under the top base chassis exterior touch input top surface or inside a base chassis sidewall touch input surface. These electrical sensor traces may be made of deposited carbon, indium tin oxide, silver traces, copper traces, or other electrical traces.

In an embodiment, the touch input sensing hardware structure may also include an active shielding layer which may be operatively coupled to a capacitive sensor microprocessor and PMU to be supplied a voltage level to shield the plurality of capacitive sensor pads from parasitic capacitive grounding to a grounding source such as a grounding layer of the touch input sensing hardware structure. During normal operation of the capacitive sensor pads, a capacitive pads microprocessor in an embodiment may execute machine readable code instructions of capacitive pads driver firmware to place an active shielding layer of the chassis touch input sensing hardware structure in a default shielding state. In such a state, the active shielding pads may reduce parasitic capacitance grounding between the capacitive sensor pads and a grounding layer placed below the active shielding layer by requiring the capacitive fields of the capacitive sensor pads to go around the active shielding pads to reach the grounding layer. Thus, these active shielding pads of the active shielding layer improve signal-to-noise ratio and extend the sensing range of the plurality of capacitive sensor pads on the capacitive pads layer such as for detecting lower capacitive change levels, for example, that may be associated with gesture inputs hovering above the base chassis exterior touch input top surface, or touch inputs at the base chassis sidewall touch input surface or even an exterior surface of the display lid chassis when the clamshell chassis is placed in a closed configuration. Indeed, in an embodiment, the active shielding pads allow a user to provide input, such as gesture input, even when the user is not in physical contact with any surfaces of the base chassis or allows detection of user input at or above the display lid chassis, which may be detected as a capacitive change from the capacitive sensor pads. This is because the capacitive sense capabilities of the capacitive sensor pads is extended a distance above the outer chassis surfaces due to the inclusion of the shielding pads of the active shielding layer limiting the parasitic capacitive grounding of the capacitive fields of the capacitive sensor pads.

In other words, the touch input sensing hardware structure and chassis touch input sensing hardware structure of embodiments of the present disclosure allow for sensing of user touch input at various surface locations of the base chassis and display lid chassis both when the clamshell chassis is in an open position and in a closed position. This presents a need to control which user touch inputs may be detected when the chassis is in a closed position and when the chassis is in an open position. For example, it may be desirable to provide for user touch input at detectable upward from the top base chassis exterior touch input top surface to control display brightness when the clamshell chassis is in an open configuration, with the digital display powered on. As another example, it may be desirable to provide for user touch input detectable from the side of the base chassis sidewall touch input surfaces and not upward from the top base chassis exterior touch input top surface for an IO device control, such as a speaker volume, when the clamshell chassis is in a closed position, to avoid inadvertent activation, deactivation, or modification of IO devices by the closed display lid chassis when the user is handling the clamshell chassis in a closed position during transit.

Embodiments of the present disclosure address these issues by executing machine readable code instructions of a lid position based input location mapping engine, via a capacitive sensor microprocessor, to activate or deactivate capacitive sensor pads at either the top base chassis exterior touch input top surface or the base chassis sidewall touch input surface based on a configurational position (e.g., open or closed) of the clamshell chassis as determined by an inertial measurement unit or hall sensor, for example. Activation and deactivation or combining to form a larger pad of capacitive sensor pads in various embodiments described herein may be affected by grounding such capacitive sensor pads, either by minimizing voltage supplied to the active shields disposed between those capacitive sensor pads and a ground layer, grounding the active shield to effectively drive the capacitive sensor pads to ground their capacitive fields, or by directly grounding the capacitive sensor pads. In any one of these cases, the lid position based input location mapping engine in embodiments of the present disclosure may disable capacitive sensor pads sensing touch input at the base chassis sidewall touch input surface when the clamshell chassis is set to an open position, and disable capacitive sensor pads sensing touch input at the top base chassis exterior touch input top surface when in a closed position. Further, the lid position based input location mapping engine may map touch input detected at a specified location of the top base chassis exterior touch input top surface or base chassis sidewall touch input surface situated nearest an IO device for a user input IO command to control that IO device or control a function on the information handling system thus allowing for more intuitive control of IO devices via touch input.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 144, a base station transceiver 146, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 112, (volatile (e.g., random-access memory, etc.), or static memory 114, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, a neural processing unit (NPU) 110, an accelerated processing unit (APU) 108, other types of hardware processing devices, or any combination thereof. It is appreciated that the information handling system 100 may include any number of hardware processing devices described herein. Computer readable code instructions stored in main memory 112 (e.g., RAM) may be accessible by hardware processing resources using that main memory 112. Machine readable code instructions stored in static memory 114, main memory 112, or drive unit 126 may be involved in invoking such machine readable code instructions to main memory 112 according to embodiments herein. Additional components of the information handling system 100 may include one or more storage devices such as static memory 114 or drive unit 126. The information handling system 100 may include or interface with one or more communications ports for communicating with external devices, as well as various wired or wireless input and output (IO) devices 148, such as a mouse 158, a trackpad 156, a speaker 154, a traditional dive-board installed laptop keyboard 151, a split-keyboard structure 152, a video/graphics display device 150, a microphone 160, or any combination thereof. Further, various wired or wireless input and output (IO) devices 148, such as a microphone 160, speaker, a trackpad 156, a speaker 154, a traditional dive-board installed laptop keyboard 151, a split-keyboard structure 152, a video/graphics display device 150, mouse 158, or any combination thereof may be integrated into the chassis of the information handling system 100 in other embodiments. In some embodiments, a split-keyboard structure 152 may be formed with keyboard keys in a removable tactile input layer 162 having one or more keyboard layouts or IO structure layouts such as a touch surface according to various embodiments of the present disclosure. Portions of an information handling system 100 may themselves be considered information handling systems 100.

Information handling system 100 may include devices or modules that embody one or more of the devices or execute instructions for one or more systems and modules. The information handling system 100 may execute machine readable code instructions (e.g., software algorithms) parameters, and profiles 118 that may operate on servers or systems, remote data centers, or on-box in individual client information handling systems according to various embodiments herein. In some embodiments, it is understood any or all portions of machine readable code instructions (e.g., software algorithms) parameters, and profiles 118 may operate on a plurality of information handling systems 100.

The information handling system 100 may include the hardware processor 102 such as a central processing unit (CPU) or other hardware processing resources (e.g., 104, 106, 108, 110). Any of the hardware processing resources may operate to execute computer readable code instructions that are either firmware or software code, such as those software systems and modules described herein. Moreover, the information handling system 100 may include memory such as main memory 112, static memory 114, and disk drive unit 126 (volatile (e.g., random-access memory, etc.), non-volatile memory (read-only memory, flash memory etc.) or any combination thereof or other memory with computer readable medium 116 storing machine readable code instructions (e.g., software algorithms) parameters, and profiles 118 executable by the hardware processor 102 (e.g., central processing unit), NPU 110, APU 108, EC 104, GPU 106, or any other hardware processing device. The information handling system 100 may also include one or more buses 124 operable to transmit communications between the various hardware components such as any combination of various wired or wireless IO devices 148 as well as between hardware processors 102, an EC 104, the operating system (OS) 122, the basic input/output system (BIOS) 120, the wireless interface adapter 134, or a radio module, among other components described herein. In an embodiment, the hardware processor 102, EC 104, GPU 106, NPU 110, APU 108, and/or others may execute one or more bus drivers in order to transmit this data between the information handling system 100 and the wired or wireless input/output devices 148 described herein. In an embodiment, the information handling system 100 may be in wired or wireless communication with the wired or wireless IO devices 148 such as a split-keyboard structure 152 of some embodiments herein, a traditional dive-board installed laptop keyboard 151 of other embodiments herein, a mouse 158, video/graphics display device 150, speaker 154, trackpad 156, microphone 160, or speaker among other peripheral devices.

As described herein, the information handling system 100 further includes a video/graphics display device 150. The video/graphics display device 150 in an embodiment may function as a liquid crystal display (LCD), an organic light emitting diode (OLED), a flat panel display, or a solid-state display. It is appreciated that the video/graphics display device 150 may be wired or wireless and may be an external video/graphics display device 150 that allows a user to increase the desktop area by extending the desktop in an embodiment. Additionally, as described herein, the information handling system 100 may include or be operatively coupled to a cursor control device (e.g., a trackpad 156, or gesture or touch screen input), a speaker 154, a traditional dive-board installed laptop keyboard 151, and/or a split-keyboard structure 152, among others that allows the user to interface with the information handling system 100 via the video/graphics display device 150. Information handling system 100 may also be operatively coupled to a wired or wireless input/output device 148 or other hardware devices that may include a hardware processing device such as a hardware processor, microcontroller, or other hardware processing resource. Various drivers and hardware control device electronics may be operatively coupled to operate the wired or wireless IO devices 148 according to the embodiments described herein.

A network interface device of the information handling system 100 may be wired or wireless such as shown with wireless interface adapter 134 that can provide wireless connectivity among devices such as with Bluetooth® or to a network 142, e.g., a wide area network (WAN), a local area network (LAN), wireless local area network (WLAN), a wireless personal area network (WPAN), a wireless wide area network (WWAN), or other network. In embodiments described herein, the wireless interface device 134 with its radio 136, RF front end 138 and antenna 140 is used to communicate with the wireless peripheral devices, via, for example, a Bluetooth® or Bluetooth® Low Energy (BLE) protocols or any proprietary RF protocol such as those may utilize similar frequency ranges but proprietary modulation and data transmission characteristics. In embodiments, Bluetooth®, BLE, proprietary RF protocol, or other WPAN or WLAN protocols and plural such protocols may be used for communication with and among any wireless peripheral device to be paired or paired with the information handling system 100 or other information handling systems.

In other embodiments, a WAN, WWAN, LAN, and WLAN may each include an AP 144 or base station 146 used to operatively couple the information handling system 100 to a network 142 via a wireless interface adapter 134. In a specific embodiment, the network 142 may include macro-cellular connections via one or more base stations 146 or a wireless AP 144 (e.g., Wi-Fi), or such as through licensed or unlicensed WWAN small cell base stations 146. Connectivity may be via wired or wireless connection. For example, wireless network wireless APs 144 or base stations 146 may be operatively connected to the information handling system 100. Wireless interface adapter 134 may include one or more RF (RF) subsystems (e.g., radio 136) with transmitter/receiver circuitry, modem circuitry, one or more antenna RF (RF) front end 138 circuits, one or more wireless controller circuits, amplifiers, antennas 140 and other circuitry of the radio 136 such as one or more antenna ports used for wireless communications via multiple radio access technologies (RATs). The radio 136 may communicate with one or more wireless technology protocols.

In an embodiment, the wireless interface adapter 134 may operate in accordance with any wireless data communication standards. To communicate with a wireless local area network, standards including IEEE 802.11 WLAN standards (e.g., IEEE 802.11ax-2021 (Wi-Fi 6E, 6 GHZ)), IEEE 802.15 WPAN standards, WWAN such as 3GPP or 3GPP2, Bluetooth® standards, proprietary RF protocol, or similar wireless standards may be used. Wireless interface adapter 134 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 134 can represent an add-in card, wireless network interface module that is integrated with a main board of the information handling system 100 or integrated with another wireless network interface capability, or any combination thereof.

In some embodiments, a hardware processing resource executes machine readable code instructions of software or firmware to implement one or more of some systems and methods described herein, or dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware devices with related control and data signals that may be communicated between and through the modules, or as portions of an application-specific integrated circuit. Accordingly, the present system encompasses a hardware processing resource executing machine readable code instructions of software or firmware as well as hardware implementations or any combination.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes machine readable code instructions, parameters, and profiles 118 or receives and executes machine readable code instructions, parameters, and profiles 118 responsive to a propagated signal, so that a hardware device connected to a network 142 may communicate voice, video, or data over the network 142. Further, the machine readable code instructions, parameters, and profiles 118 may be transmitted or received over the network 142 via the network interface device or wireless interface adapter 134.

The information handling system 100 may include a set of machine readable code instructions, parameters, and profiles 118 that may be executed to cause the computer system to perform any one or more of the methods or computer-based functions disclosed herein. For example, machine readable code instructions, parameters, and profiles 118 may be executed by a hardware processor 102, GPU 106, EC 104, APU 108, NPU 110, or any other hardware processing resource and may execute software applications, agents, firmware, or other aspects or components used to execute the methods and systems described herein. Various software modules comprising application machine readable code instructions, parameters, and profiles 118 may be coordinated by an operating system (OS) 122, and/or via an application programming interface (API) include a unified device API described herein. An example OS 122 may include Windows®, Android®, and other OS types. Example APIs may include Win 32, Core Java API, or Android APIs.

In an embodiment, the information handling system 100 may include a disk drive unit 126. The disk drive unit 126 and may include machine-readable program code instructions, parameters, and profiles 118 in which one or more sets of machine-readable program code instructions, parameters, and profiles 118 such as firmware or software can be embedded to be executed by the hardware processor 102 (e.g., CPU) or other hardware processing devices such as a GPU 106, an EC 104, an NPU 110, an APU 108, or other hardware processing resource device to perform the processes described herein. Similarly, main memory 112 and static memory 114 may also contain a computer-readable medium for storage of one or more sets of machine-readable program code instructions, parameters, or profiles 118 described herein. The disk drive unit 126 or static memory 114 also contain space for data storage. Further, the machine-readable program code instructions, parameters, and profiles 118 may embody one or more of the methods as described herein. In a particular embodiment, the machine-readable program code instructions, parameters, and profiles 118 may reside completely, or at least partially, within the main memory 112, the static memory 114, and/or within the disk drive 126 during execution by the hardware processor 102, EC 104, APU 108, NPU 100, or GPU 106 of information handling system 100.

Main memory 112 or other memory of the embodiments described herein may contain computer-readable medium (not shown), such as RAM in an example embodiment. An example of main memory 112 includes random access memory (RAM) such as static RAM (SRAM), dynamic RAM (DRAM), non-volatile RAM (NV-RAM), or the like, read only memory (ROM), another type of memory, or a combination thereof. Static memory 114 may contain computer-readable medium (not shown), such as NOR or NAND flash memory in some example embodiments. The applications and associated APIs, for example, may be stored in static memory 114 or on the disk drive unit 126 that may include access to a machine-readable code instructions, parameters, and profiles 118 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 128 (a.k.a. a power supply unit (PSU)). The PMU 128 may include a hardware controller and executable machine-readable code instructions to manage the power provided to the components of the information handling system 100 such as the hardware processor 102 and other hardware components described herein. The PMU 128 may control power to one or more components including the one or more drive units 126, the hardware processor 102 (e.g., CPU), the EC 104, the GPU 106, the APU 108, the NPU 110, a video/graphic display device 150, or other wired or wireless IO devices 148 such as the mouse 158, the speaker 154, a traditional dive-board installed laptop keyboard 151, the split-keyboard structure 152, microphone 160, and the track-pad 156 and other components that may require power when a power button has been actuated by a user. In an embodiment, the PMU 128 may monitor power levels and power may be electrically coupled to the information handling system 100 via various ports in embodiments herein to provide this power. The PMU 128 may be coupled to the bus 124 to provide or receive data or machine-readable code instructions. The PMU 128 may regulate power from a power source such as the battery 130, or AC power adapter 132 such as from one or more ports. In an embodiment, the battery 130 may be charged via the AC power adapter 132 and provide power to the components of the information handling system 100 when AC power from the AC power adapter 132 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 116 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, an information handling system 100 may be housed in a clamshell type chassis, such as a laptop computer, having a base chassis that houses some of the IO devices 148, and a chassis touch input sensing hardware structure 165 that senses capacitive changes in capacitive sensor pads of a capacitive pads layer 166 disposed beneath a chassis touch input surface 164. The chassis touch input surface 164 include be any of a base chassis exterior touch input top surface, a base chassis sidewall touch input surface, or a display chassis lid input surface in embodiments herein, A user interacts with that chassis touch input surface 164 through touch or by hovering a finger or portion of a hand just above that surface. In some embodiments, this base chassis exterior touch input top surface, base chassis sidewall touch input surface, or display chassis lid input surface acting as a chassis touch input surface 164 through which the capacitive sensor pads of one or more capacitive pads layers 166 may sense such user touch input may surround a traditional mechanical keyboard 151 and track-pad 165. In other embodiments, this chassis touch input surface 164 may be formed as a sealed input surface upon which a removable tactile input layer 162, such as one with an interchangeable keyboard as described herein, may be disposed and used to sense user touch inputs on the base chassis exterior touch input top surface or on a display lid chassis touch input surface in a closed position of the clamshell information handling system chassis in example embodiments. The clamshell chassis may further include a display chassis, in an embodiment, which may house the video/graphics display device 150 described herein. The base portion may be where the split-keyboard structure 152 or a traditional dive-board installed laptop keyboard 151 is placed, giving the user the ability to provide input to the information handling system 100.

Capacitive sensor pads of the capacitive pads layer 166 in an embodiment may sense capacitive changes to portions of the top surface of the base chassis, such as the base chassis exterior touch input top surface operating as the chassis touch input surface 164 or as part of the removable tactile input layer 162, as well as sidewalls of the base chassis functioning as the base chassis sidewall touch input surface, and even the exterior surface of a display chassis housing digital display device 150 when the clamshell chassis is in a closed position, making each of these surfaces potential touch input surfaces. By placing such capacitive sensor pads of the capacitive pads layer 166 nearby IO devices 148, such as microphone 160, speaker 154, display device 150, wireless antenna 140, or the trackpad 156, the area around any given IO device on these potential touch input surfaces may provide an intuitive location for touch input to control that specific I/O device for control device inputs into the information handling system 100. For example, placement of a capacitive sensor pad of the capacitive pads layer 166 nearby a microphone 160 for sensing a user tapping or pressing the base chassis exterior touch input top surface operating as the chassis touch input surface 164 or the base chassis sidewall touch input surface situated nearest the known location of the microphone 160 or a speaker 154 may provide a location for sensing user tapping for functional control device input in pressing to mute or unmute the microphone 160 or a speaker 154 or a swiping touch input to adjust volume of the microphone 160 or a speaker 154 that is more intuitive to a user than a button or hotkey of a keyboard 151. Such button arrays or hotkeys currently used to control such a microphone 160 or a speaker 154 may be unintuitive and busy and hard to locate. Embodiments of the present disclosure may also save space otherwise reserved for those buttons or hotkeys in or around the keyboard 151 that are dedicated to adjusting control of the microphone 160, speaker 154, or other IO devices 148, such as the trackpad 156, display device 150, or wireless antenna 140, for example.

As described herein, in some embodiments, the top outer surface of the base chassis through which the capacitive sensor pads sealed underneath may sense user touch or proximity input may comprise the designated chassis touch input surface 164 of the base chassis and may be any location on the base chassis such as those base chassis top surface portions that surround a keyboard 151 or a touchpad 156 in the base chassis. In such an embodiment, the base chassis of the information handling system 100 may include a chassis touch input surface 164 that is a surface disposed above or exterior to a chassis touch input sensing hardware structure 165 formed under and sealed within the base chassis exterior touch input top surface acting as the chassis touch input surface 164 in embodiments herein. This base chassis exterior touch input top surface acting as the chassis touch input surface 164 may be disposed atop the embedded chassis touch input sensing hardware structure 165 including capacitive sensing technologies with capacitive sensor pads of a capacitive pads layer 166 that detects presence, touch, and movement of user fingers or portions of the user's hands made on or just above the top base chassis exterior touch input top surface that is acting as the chassis touch input surface 164 in embodiments herein. In further embodiments, the embedded chassis touch input sensing hardware structure 165 disposed beneath the base chassis exterior touch input top surface acting as the chassis touch input surface 164 may be active when a display lid chassis is in an open position and inactive when the display lid chassis is in a closed position pursuant to execution of machine readable code instructions of a lid position based input location mapping engine 172 in embodiments herein. In other embodiments, the base chassis exterior touch input top surface acting as the chassis touch input surface 164 may be active and even increased in range or sensitivity when a display lid chassis is closed and a touch input is detected with a strain gauge 153 on a display lid touch input surface acting as the touch input surface 164.

As described herein, in other embodiments, the sidewall outer surface of the base chassis through which the capacitive sensor pads sealed underneath may sense user touch input may comprise a designated base chassis sidewall touch input surface of the base chassis acting as the chassis touch input surface 164 and may be any location on the base chassis sidewalls. In such an embodiment, the base chassis of the information handling system 100 may include a base chassis sidewall touch input surface acting as the chassis touch input surface 164 and disposed externally to a chassis touch input sensing hardware structure 165 formed within the base chassis sidewall. This base chassis sidewall touch input surface acting as the chassis touch input surface 164 may be disposed external to the embedded chassis touch input sensing hardware structure 165 including capacitive sensing technologies with capacitive sensor pads of a capacitive pads layer 166 that detect presence, touch, and movement of user fingers or portions of the user's hands made on or just external to the base chassis sidewall touch input surface acting as the chassis touch input surface 164 in embodiments herein. In further embodiments, the embedded chassis touch input sensing hardware structure 165 internal to the base chassis sidewall touch input surface acting as the chassis touch input surface 164 may be active when a display lid chassis is in a closed position and inactive when the display lid chassis is in an open position pursuant to execution of machine readable code instructions of a lid position based input location mapping engine 172.

As also described herein, in other embodiments, the top surface of the base chassis through which capacitive sensor pads may sense user touch input may be formed as a sealed input surface upon which a removable tactile input layer 162, such as an interchangeable keyboard 151, may be disposed or installed, as described herein in greater detail below with respect to FIG. 5. In such an embodiment, a keyboard 151 may be used with a laptop-type information handling system 100 that includes a split keyboard type design with a purely mechanical removable tactile input layer 162 that may include keyboard keys that a user may use to provide input to the laptop-type information handling system 100. Capacitive sensor pads of the capacitive pads layer 165 may be formed under the sealed input surface in some such embodiments. The laptop-type information handling system 100 in the present specification also includes a chassis touch input surface 164 with a chassis touch input sensing hardware structure 165 formed under the chassis touch input surface 164 that is a base chassis exterior touch input top surface separate from the removable tactile input layer 162 or particular structures thereon such as a mechanical keyboard in some embodiments. In both an embodiment with a traditional keyboard 151 and chassis touch input surface 164 and in an embodiment with the split keyboard type design, the same capacitive sensing technologies may be used to allow for sensing of user touch or gesture on or nearby a base chassis exterior top surface (e.g., a c-cover or portions of an installed removable tactile input layer 162), a base chassis sidewall (e.g., left wall, right wall, front wall, rear wall), or even user touch on a display lid chassis touch input surface with the display lid chassis is in a closed position.

The touch input sensing hardware structure 165 formed under the base chassis touch input surface 164 may include a plurality of layers used to detect user touch input or user touchless gesture input at or above (or exterior to) the base chassis touch input surface 164. In some embodiments, the base chassis touch input surface 164 may be sealed such that liquids, dust, and other contaminants cannot enter into the base portion of the information handling system 100. This prevents those contaminants from damaging those hardware elements formed into the housing of the base portion of the information handling system 100.

In an example embodiment, the touch input sensing hardware structure 165 formed under the base chassis touch input surface 164 may include a capacitive pads layer 166. The capacitive pads layer 166 includes a plurality of capacitive sensor pads that may correspond to specific IO devices 148, or keyboard keys in the removable tactile input layer 162, to detect capacitive changes due to a user touching or gesturing nearby a portion of the base chassis touch input surface 164 or base chassis sidewall located closest to one of the plurality of IO devices 148 or antenna 140, or actuation of keyboard keys of the removable tactile input layer 162 above the base chassis touch input surface 164 of the chassis of the information handling system 100. Further, the capacitive pads layer 166 includes a plurality of capacitive sensor pads to detect capacitive changes due to touch input by a user's fingers on keys or IO structures on the removable tactile input layer 162 in an embodiment. In yet another embodiment, the capacitive pads layer 166 may include the plurality of capacitive sensor pads that may detect capacitive changes due to sensing proximate location of the user's body part, including fingers or hand for a touchless gesture, above those keyboard keys of the removable tactile input layer 162 and above the base chassis touch input surfaces 164 such as a base chassis exterior top surface or sidewalls of the base chassis of the information handling system.

In an embodiment, these capacitive sensor pads may be made of deposited carbon pads which may be delicate, but are protected and sealed under the base chassis touch input surface 164 of the chassis of the information handling system 100 for the touch input sensing hardware structure 165 and are contactless and never touched during keypresses. The deposited carbon capacitive sensing pads of the capacitive pads layer 166 have a benefit of very low cost and simple manufacturing via deposition or masked spraying to form these deposited carbon capacitive sensing pads. In an embodiment, these capacitive sensing pads of deposited carbon may be configured to include an electric capacitive sensing field that responds to changes in nearby capacitance due to a user's finger, hand, or other structure entering and moving within the capacitive sensing field. These carbon-based patches may be arranged in a sensor matrix of capacitive sensing pads and may be printed, spattered, or otherwise deposited on a non-conductive substrate such as an ABS polymer surface such as the underside of the base chassis touch input surface 164 or on a PCB or flexible PCB at very low cost. In an embodiment, the array of deposited carbon patches for the capacitive sensing pads in the capacitive pads layer 166 may be arranged such that one or more of IO devices 148 or antenna 140, or icons therefor, as printed or etched onto the base chassis touch input surface 164 aligns vertically or horizontally over or beside the base chassis touch input surface 164 with a deposited carbon patch capacitive sensing pad of the touch input sensing hardware structure 165 formed under the base chassis touch input surface 164.

In an embodiment, each of the plurality of capacitive sensor pads in the capacitive pads layer 166 may be operatively coupled to a capacitive sensor microprocessor 170 executing machine readable code instructions of a capacitive sensor driver 168. In an embodiment, each of the carbon capacitive sensing pads that form the plurality of capacitive sensors of the capacitive pads layer 166 may be operatively coupled to the capacitive sensor microprocessor 170 via carbon traces formed on a surface such as a printed circuit board (PCB) or a flexible PCB or on an ABS surface, or some combination in embodiments described herein. It is also appreciated that other types of traces may be formed to operatively couple the carbon pads to the capacitive sensor microprocessor 170 executing machine readable code instructions of the capacitive sensor driver 168 such as copper traces, silver traces, or indium tin oxide (ITO) that allow each of the carbon pads to conduct signals to the capacitive sensor driver 168 for determination of a user's touch input (e.g., at an IO device 148, or an icon therefor), or determination of a user's touchless gesture input at or near the removable tactile input layer 162, or base chassis touch input surface 164. The capacitive sensor driver 168 may be executed by a capacitive sensor microprocessor 170 to detect and determine which of the capacitive pads at a portion of the base chassis touch input surface 164 corresponding to one of the IO devices 148 or icons of the same on or in the base chassis or which of a plurality of keys on the removable tactile input layer 162 has been pressed and detected at each of the plurality of capacitive sensor pads based on location and a detected level of capacitance change. The capacitive sensor microprocessor 170 executing the machine readable code instructions of the capacitive sensor driver 168 may relay these inputs to the hardware processor 102 for processing of functional IO device inputs, computing device control inputs, or keystrokes as input to the information handling system 100 in embodiments herein.

In an embodiment, the base chassis touch input surface 164 may include an active shielding layer 174 to shield the plurality of capacitive sensors within the capacitive pads layer 166 from a grounding layer 176 serving as an electromagnetic interference (EMI) and grounding for the touch input sensing hardware structure 165. In an embodiment, the touch input sensing hardware structure 165 may include the active shielding layer 174 which may be operatively coupled to a capacitive sensor microprocessor 170 and PMU 128 to be supplied a voltage level to shield the plurality of capacitive sensor pads of the capacitive pads layer 166 from parasitic capacitive grounding to a grounding source such as a grounding layer 176 of the touch input sensing hardware structure 165. During normal operation of the capacitive sensor pads within the capacitive pads layer 166, a capacitive pads microprocessor 170 in an embodiment may execute machine readable code instructions of capacitive pads driver 168 firmware to place an active shielding layer 174 of the chassis touch input sensing hardware structure 165 in a default shielding state. In such a state, the active shielding pads of the active shielding layer 174 may reduce parasitic capacitance grounding between the capacitive sensor pads of the capacitive pads layer 166 and the grounding layer 176 placed below the active shielding layer 176 by requiring the capacitive fields of the capacitive sensor pads to go around the active shielding pads to reach the grounding layer 176.

The grounding layer 176 may act as a controlled return path for noise from the information handling system components or external noise to operate as external EMI shield as well as serve as a grounding source for the touch input stack structures 152 including as a capacitive ground source for the capacitive pads layer 166. In an embodiment, the active shielding layer 174 may be operatively coupled to a voltage source as controlled by the capacitive sensing microcontroller 170 as a feature of the capacitive driver such that the voltage level of the active shielding in the active shielding layer 174 is held at about that of the capacitive sensing pads of the capacitive pads layer 166 to prevent parasitic grounding of the capacitive sensing pads by the grounding layer 176. With such parasitic capacitive grounding, the capacitive sensing fields may be reduced for the capacitive sensing pads thereby reducing their detection reach and effectiveness to receive touch inputs.

This grounding layer 176 is used for the touch input sensing hardware structure 165 grounding and EMI and noise shielding, but due to the thin profile of the touch input sensing hardware structure 165 formed under the base chassis touch input surface 164, is potentially close to the capacitive sensing layer 166 and may disrupt the operation of the plurality of capacitive sensor pads (e.g., carbon pads) within the capacitive pads layer 166, via this parasitic capacitance grounding of those capacitive sensing pads from detecting other capacitive changes due to user inputs. This active shielding layer 174 may be driven using the same voltage as the plurality of capacitive sensor pads within the capacitive pads layer 166 in some embodiments. This reduces parasitic capacitance between the plurality of capacitive sensor pads of the capacitive pads layer 166 and the grounding layer 176 placed below the active shielding layer 174. Thus, the active shielding layer 174 improves signal-to-noise ratio and extends capacitive sensing range of the plurality of capacitive sensor pads of the capacitive pads layer 166 in the touch input sensing hardware structure 165 formed under the base chassis touch input surface 164, such as for detecting lower capacitive change levels, for example, that may be associated with gesture inputs hovering above the base chassis exterior touch input top surface, or touch inputs at the base chassis sidewall touch input surface or even an exterior surface of the display lid chassis when the clamshell chassis is placed in a closed configuration. Indeed, in an embodiment, the active shielding pads allow a user to provide input, such as gesture input, even when the user is not in physical contact with any surfaces of the base chassis or allows detection of user input at or above the display lid chassis, which may be detected as a capacitive change from the capacitive sensor pads. This is because the capacitive sense capabilities of the capacitive sensor pads is extended a distance above the outer chassis surfaces, such as the chassis touch input surfaces 164, due to the inclusion of the shielding pads of the active shielding layer limiting the parasitic capacitive grounding of the capacitive fields of the capacitive sensor pads.

In an embodiment, the base chassis touch input surface 164 may also include the grounding layer 176 to prevent EMI interference or radiation emitted from within the information handling system to the outside environment and provide a stable electrical reference for the active circuitry of the touch input sensing hardware structure 165 formed under the base chassis touch input surface 164 and help to define signal baseline at the plurality of capacitive sensors. It is appreciated that other hardware components of the information handling system 100 may be placed below the ground layer 176 within the base chassis that may include an information handling system hardware mainboard that may house the hardware processor 102, other processing devices (e.g., 104, 106, 108, 110), the PMU 130, the wireless interface adapter 134, the radio 136, the RF front end 138, and the antenna 140 among other hardware components. Thus, the grounding layer 176 may prevent any EMI and noise from or to those hardware components as described herein.

In other words, the touch input sensing hardware structure 165 in an embodiment may allow for sensing of user touch input at various exterior surface locations of the base chassis and display chassis both when the clamshell chassis is in an open position and in a closed position. This presents a need to control which user touch inputs may be detected when the chassis is in a closed position and when the chassis is in an open position. For example, it may be desirable to only allow for user touch input at the base chassis exterior touch input top surface 165 to control display 150 brightness when the clamshell chassis is in an open configuration, with the digital display 150 powered on. As another example, it may be desirable to only allow for user touch input at the base chassis sidewall touch input surface when the clamshell chassis is in a closed position, to avoid inadvertent activation, deactivation, or modification of IO devices 148 via user touch input at the base chassis sidewall touch input surface when the user is handling the clamshell chassis in a closed position during transit.

Because of the layout of the various layers of the touch input sensing hardware structure 165, the touch input sensing hardware structure 165 may not only operate to recognize tactile input such as a keypress or touch inputs at the removable tactile input layer 162 as well as touch inputs at the one or more chassis touch input surfaces 164 when the clamshell chassis is placed in a closed position, but may also recognize when a user's fingers are hovering over any of these chassis touch input surfaces 164 or the removable tactile input layer 162 in a touchless gesture input function. This allows for touchless gesture inputs as well as touch inputs and keypresses to be received at these chassis touch input surfaces 164, as sensed by contactless capacitive sensing with the touch input sensing hardware structure 165 formed under the various base chassis touch input surfaces 164. Touch input and touchless gestures may include swiping gestures and the like in order to provide various different types of input at the removable tactile input layer 162, or base chassis touch input surface 164, such as base chassis exterior touch input top surface locations, base chassis sidewall touch input surface locations, display chassis lid touch input surface locations on the information handling system 100.

As described herein, machine readable code instructions 118 of a capacitive sensor driver 168 executes on the capacitive sensor microprocessor 170 to process various types of user input via the base chassis touch input surfaces 164, as characterized by one or more detected capacitive change levels and characterized by location or movement across locations in the network of capacitive sensor pads within the capacitive pads layer 166, as IO input or computing device function control inputs from the user for the hardware processor 102 of the information handling system 100. If the detected capacitive change is at a first capacitive change level, the capacitive sensor driver 168 may relay the sensed change from the capacitive sensor microprocessor 170 to the hardware processor 102 for processing of a single tap or touch as input to software or firmware applications executing on the information handling system 100. Similarly, a second level of capacitive change or detection across plural capacitive sensor pads of the presence of motion from the touch input or touchless gesture input of a human finger or hand detected at one or more capacitive sensor pads may indicate a touchless input above a location of one or more base chassis touch input surfaces 164 such that the capacitive sensor microprocessor 170 executing the capacitive sensor driver 168 may determine an input gesture of the user correlating to some computing device functional control input in some embodiments. In an example embodiment, the second level of capacitive change may be lower or less than the first level of capacitive change associated with a touch or tap.

Even if the user touches an IO device touch input region on the top surface of the display chassis housing the digital display 150 in an embodiment, the capacitive sensor pads beneath the base chassis touch input surface 164 may register such a touch as the second level of capacitive change, normally associated with a gesture rather than a touch, due to the distance between the base chassis touch input surface 164 housing the capacitive pads layer 166 and the IO device touch input region on the top surface of the display chassis, such as on a display chassis lid touch input surface in a chassis closed position. In such a case, receiving an indication from strain gauge firmware 155 that a strain gauge 153 disposed beneath the IO device touch input region of the top surface of the display chassis has detected the user providing downward force within that region to deflect the strain gauge 153 may allow the lid position based input location mapping engine 172 to identify the detected second capacitance change as a touch on a display chassis lid touch input surface rather than a touchless input gesture.

The capacitive sensor microprocessor 170 in an embodiment may execute machine readable code instructions 118 of a lid position based input location mapping engine 172 to activate or deactivate capacitive sensor pads of the capacitive pads layer 166 of the chassis touch input sensing hardware structure 165 at either the base chassis exterior touch input top surface or the base chassis sidewall touch input surface based on a configurational position (e.g., open or closed) of the clamshell chassis as determined by an inertial measurement unit 152 or hall sensor, for example.

Activation and deactivation or combining within the chip via firmware of capacitive sensor pads of the capacitive pads layer 166 in various embodiments described herein may be affected by capacitively grounding the capacitive sensor pads, either by minimizing the voltage supplied to the active shield pads of the active shielding layer 714 disposed between those capacitive sensor pads and a grounding layer 176 and reduce their capacitive sensing fields, grounding the active shielding pads to effectively drive the capacitive sensor pads of the capacitive pads layer 166 to ground, or by directly grounding the capacitive sensor pads of the capacitive pads layer 166. In any one of these cases, the lid position based input location mapping engine 172 in an embodiment may disable capacitive sensor pads that are sensing touch input at the base chassis sidewall touch input surface acting as the chassis touch input surface 164 when the clamshell chassis is set to an open position, and disable capacitive sensor pads sensing touch input at the base chassis exterior touch input top surface 165 when in a closed position. Further, the lid position based input location mapping engine 172 in an embodiment may map touch input detected at a specified location of the base chassis exterior touch input top surface or base chassis side wall touch input surface situated nearest an IO device 148 or antenna 140 to a user input IO command for that IO device 148 or antenna 140, to allow for more intuitive control of IO devices 148 and antenna 140 via touch input.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
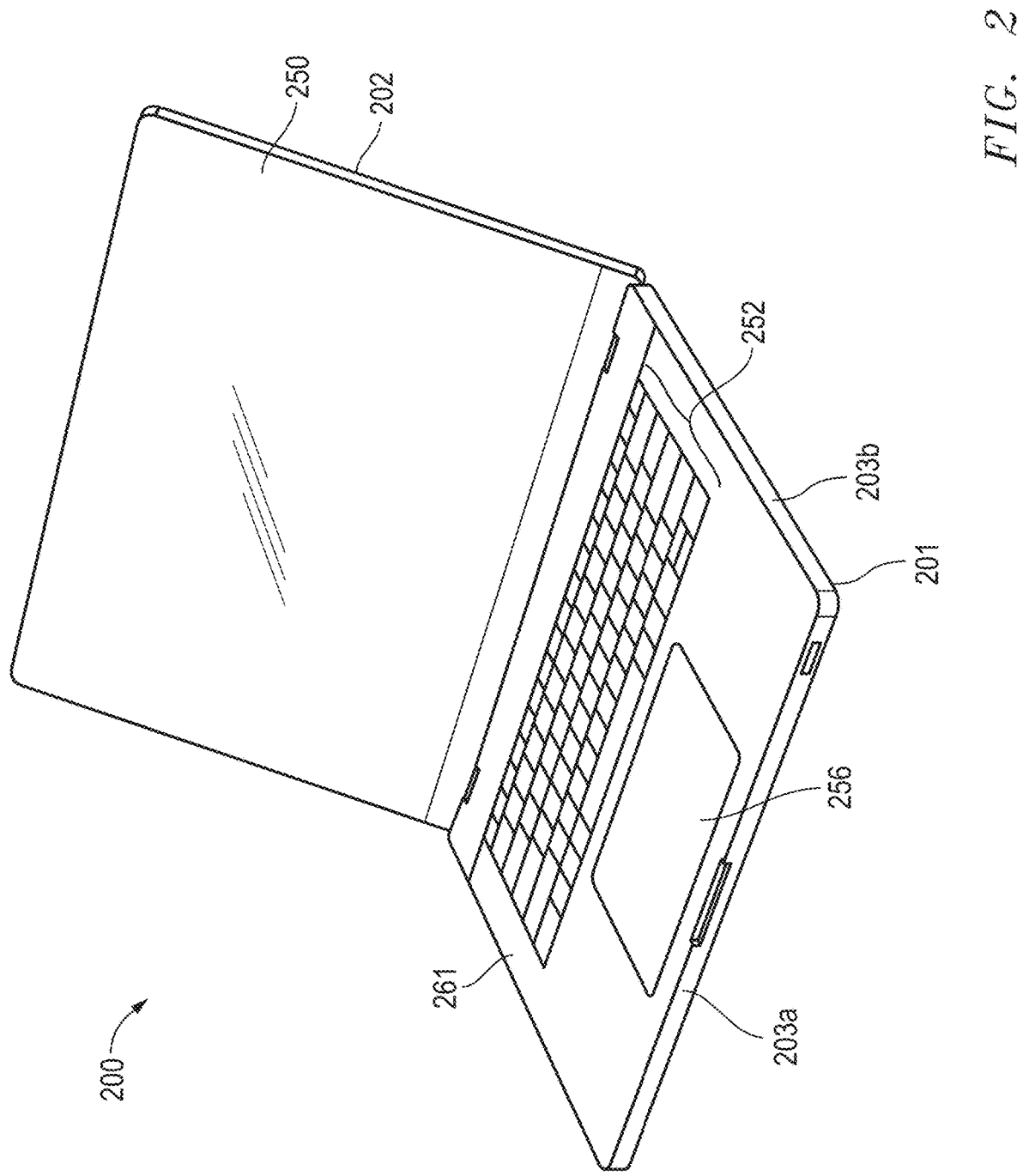
FIG. 2 is a graphic diagram illustrating an information handling system in an open position that includes a touch input sensing hardware structure for sensing user touch and gesture input at a base chassis exterior touch input top surface, a base chassis sidewall input surface, or a display chassis lid input surface via capacitive sensor pads sealed within the information handling system according to an embodiment of the present disclosure.

FIG. 2 is a graphic diagram illustrating an information handling system 200 in an open position that includes a base chassis exterior touch input top surface, a base chassis sidewall input surface, or a display chassis lid input surface, and a touch input sensing hardware structure for sensing touch and gesture input from a user at capacitive sensor pads sealed within the information handling system according to an embodiment of the present disclosure. As described herein, an information handling system 200 in an embodiment may be housed within a clamshell type chassis, such as a laptop computer, having a base chassis 201 that houses a keyboard 252, touchpad 256, and a plurality of information handling system hardware components as described above with respect to FIG. 1. Further the base chassis 201 houses a touch input sensing hardware structure that senses capacitive changes in capacitive sensor pads disposed beneath the base chassis exterior touch input top surface 261 or a base chassis sidewall touch input surface 203a or 203b of the base chassis 201 as a user interacts with those base chassis touch input surfaces through touch or by hovering a finger or portion of a hand just above the base chassis exterior touch input top surface 261, or beside the base chassis sidewall touch input surfaces 203a or 203b. The keyboard 252 in an embodiment may comprise a traditional dive-board installed laptop keyboard, or an interchangeable keyboard of a removable tactile input layer, as described in various embodiments herein.

The laptop-type information handling system 200 in an embodiment may include a base chassis 201 having base chassis sidewall touch input surfaces 203a and 203b which may be at various locations around a sidewall of the base chassis 201 in addition to the examples shown at 203a and 203b. The base chassis 201 in various embodiments further includes touch input sensing hardware structures formed interior to the base chassis sidewall touch input surfaces 203a and 203b of the base chassis 201 The base chassis 201 may be hinged to the display chassis 202, and may house information handling system hardware components as described in connection with FIG. 1 as well as various ports.

The base chassis 201 in various embodiments further includes the separate touch input sensing hardware structure(s) formed under the base chassis exterior touch input top surface 261 at one or more locations on the top surface of the base chassis 201. As described herein, in some embodiments, the top outer surface of the base chassis 201 through which the capacitive sensor pads sealed underneath may sense user touch input and comprises the designated base chassis exterior touch input top surface 261 of the base chassis 201 and may be any location on the base chassis 201 such as those top surface portions that surround a keyboard 252 or a touchpad 256 in the base chassis 201. In such an embodiment, the base chassis 201 of the information handling system may include a base chassis exterior touch input top surface 261 disposed above or exterior to a touch input sensing hardware structure formed under and sealed within the base chassis exterior touch input top surface 261 in an embodiment. This base chassis exterior touch input top surface 261 may be disposed atop the embedded touch input sensing hardware structure including capacitive sensing technologies with capacitive sensor pads of a capacitive pads layer that detect presence, touch, and movement of user fingers or portions of the user's hands made on or just above the base chassis exterior touch input top surface 261 in an embodiment. In further embodiments, such as that described below with respect to FIGS. 3B and 3C below, the embedded touch input sensing hardware structure disposed beneath the top base chassis exterior touch input top surface may be active when a display chassis 202 housing a digital display 250 is in an open position, as shown, and inactive when the display chassis 202 is in a closed position, pursuant to execution of machine readable code instructions of a lid position based input location mapping engine.

As described herein, in other embodiments, the sidewall outer surface of the base chassis 201 through which the capacitive sensor pads sealed underneath may sense user touch input may comprise the designated base chassis sidewall touch input surface 203a or 203b of the base chassis 202 and may be any location on the base chassis sidewalls. In such an embodiment, the base chassis 201 of the information handling system may include a base chassis sidewall touch input surface 203a or 203b disposed externally to a touch input sensing hardware structure formed within the base chassis sidewall touch input surface 203a or 203b in an embodiment. This base chassis sidewall touch input surface 203a or 203b may be disposed external to the embedded touch input sensing hardware structure including capacitive sensing technologies with capacitive sensor pads of a capacitive pads layer that detect presence, touch, and movement of user fingers or portions of the user's hands made on or just external to the base chassis sidewall touch input surface 203a or 203b in an embodiment. In further embodiments, the embedded touch input sensing hardware structure external to the base chassis sidewall touch input surface 203a or 203b may be active when a display chassis 202 is in a closed position and inactive when the display chassis 202 is in an open position, pursuant to execution of machine readable code instructions of a lid position based input location mapping engine.

As also described herein, in other embodiments, the top surface of the base chassis 201 through which capacitive sensor pads may sense user touch input may be formed as a sealed input surface upon which a removable tactile input layer such as an interchangeable keyboard 252 may be disposed, as described in greater detail below with respect to FIG. 5. In such an embodiment, a keyboard 252 may be used with a laptop-type information handling system that includes a split keyboard type design with a purely mechanical removable tactile input layer that may include keyboard keys that a user may use to provide input to the laptop-type information handling system. The laptop-type information handling system in the present specification also includes a chassis touch input surface 261 with a chassis touch input sensing hardware structure formed under the chassis touch input surface 261 that is separate from the removable tactile input layer in some embodiments. In both an embodiment with a traditional keyboard and base chassis exterior touch input top surface 261 and in an embodiment with the split keyboard type design for keyboard 252, the same capacitive sensing technologies may be used to allow for sensing of user touch or gesture on or nearby a base chassis sidewall (e.g., left wall, right wall, front wall, rear wall) or user touch on a display lid chassis touch input surface with the display chassis 202 is in a closed position.

FIG. 2A also shows a trackpad 256 installed in the base portion of the laptop-type information handling system 200. This trackpad 256 may also be used by the user to provide input to the information handling system 200. In an embodiment, the trackpad 256 may form part of the removable tactile input layer or base chassis exterior touch input top surface comprising the base chassis exterior touch input top surface 261 and may be contactlessly detected by the separate touch input sensing hardware structure formed under the removable tactile input layer or base chassis exterior touch input top surface in some embodiments. Alternatively, the trackpad 256 may form a different part of the top layer of the base chassis 201 of the information handling system 200 and may operate independently of the keyboard structure 252. In the latter embodiment, the trackpad 256 operates to receive touch and clicks at the surface of the trackpad 256 with the trackpad 256 and includes trackpad electrical circuits to receive that input.

Figure 3A:
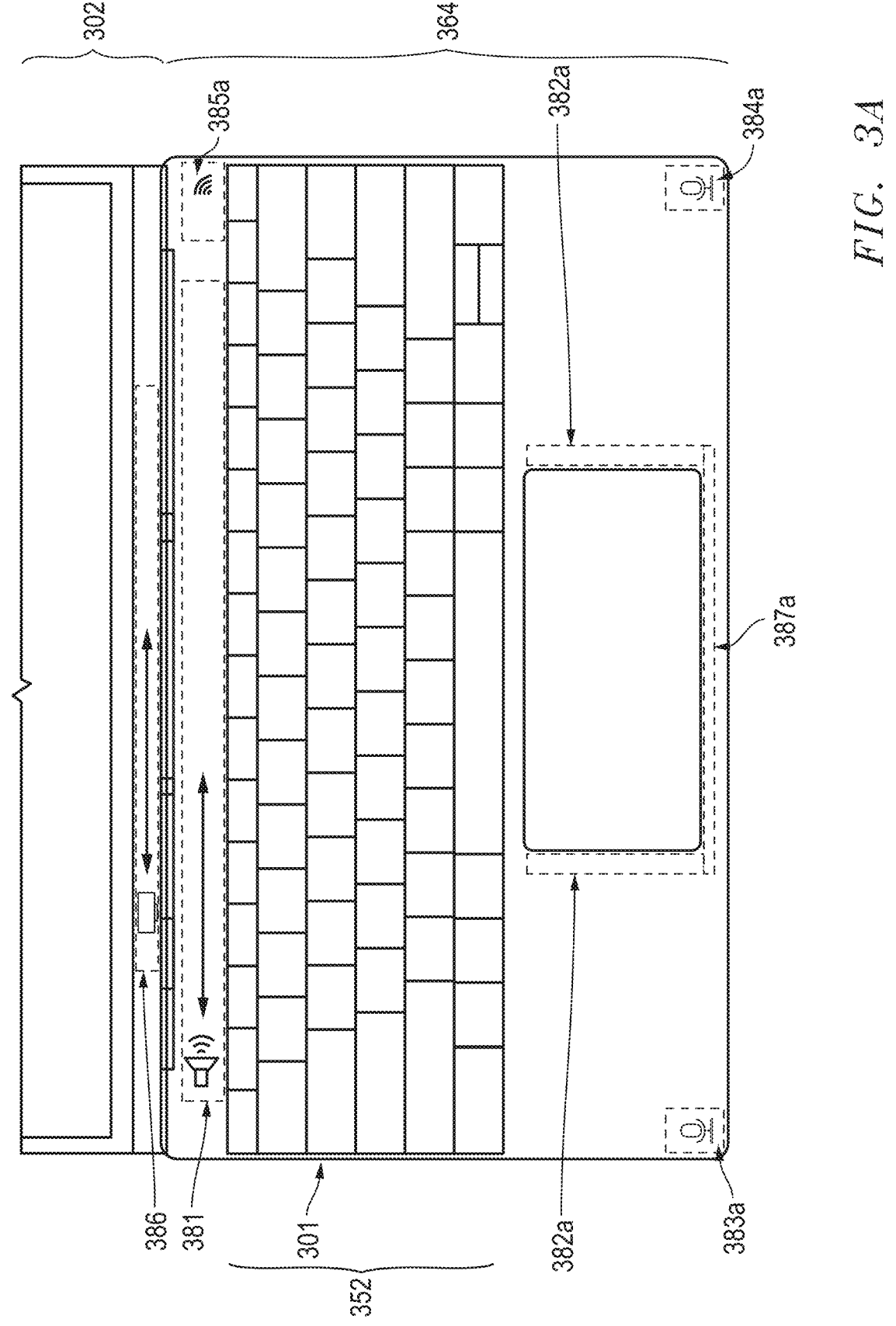
FIG. 3A is a graphic diagram illustrating a base chassis of an information handling system placed in an open configuration having a plurality of input/output (IO) device touch input regions of base chassis exterior touch input top surfaces at which capacitive sensor pads sealed within the base chassis may sense user touch input or touchless gesture input according to an embodiment of the present disclosure.

FIG. 3A is a graphic diagram illustrating a base chassis of an information handling system placed in an open configuration having a plurality of input/output (IO) device touch input regions of base chassis exterior touch input top surfaces at which capacitive sensor pads scaled within the base chassis and disposed beneath a base chassis exterior touch input top surface of the base chassis may sense user touch input or user touchless gesture input according to an embodiment of the present disclosure. As described herein, capacitive sensor pads of a touch input sensing hardware structure disposed within the base chassis 301 of an information handling system may sense capacitive changes to portions of the top surface of the base chassis 301, such as the base chassis exterior touch input top surface 364 or the removable tactile input layer, as well as at sidewalls of the base chassis and even the exterior surface of a display chassis when the clamshell chassis is in a closed position (not shown), making each of these surfaces potential touch input surfaces. By placing such capacitive sensor pads nearby IO devices and within IO device touch input regions, the area around any given IO device and within these IO device touch input regions may provide an intuitive location for touch input to control that specific IO device and provide computing device control function input. These IO device touch input regions in an embodiment may include, for example, microphone touch input regions 383a and 384 located nearest microphone IO devices, speaker touch input regions 381 located nearest a speaker IO device, digital display touch input region 386 located nearest a digital display IO device housed in the display chassis 302, wireless antenna touch input region 385a located nearest an antenna, or trackpad touch input regions 382a and 387a located nearest a trackpad IO device.

At least one top capacitive sensor pad in an embodiment may be situated under a portion of the exterior touch input surface located nearest an input/output (IO) device that the user may turn on or off using a single touch on a portion of the exterior touch input surface situated directly above the at least one top capacitive sensor pad. For example, placement of a capacitive sensor pad within microphone touch input regions 383a and 384 and nearby a microphone for sensing a user tapping or pressing the base chassis exterior touch input top surface 364 or the base chassis sidewall (e.g., base chassis sidewall touch input surfaces 203a and 203b of FIG. 2) situated nearest the known location of the microphone may provide a location for sensing user tapping or pressing to mute or unmute the microphone or a swiping touch input to adjust volume of the microphone that is more intuitive to a user than a button or hotkey of a keyboard 352 currently used to control such a microphone. This may also save space otherwise reserved for buttons or hotkeys in or around the keyboard 352 that are dedicated to adjusting control of the microphone or other IO devices, such as the touchpad, speaker, display device, or wireless antenna, for example. In another example, placement of a capacitive sensor pad within the antenna touch input regions 385a and nearby an antenna for sensing a user tapping or pressing the base chassis exterior touch input top surface 364 or the base chassis sidewall situated nearest the known location of the antenna may provide a location for sensing user tapping or pressing to activate or deactivate the antenna that is more intuitive to a user than a button or hotkey of a keyboard 352 currently used to control such an antenna. In yet another example, placement of a capacitive sensor pad within the trackpad touch input regions 382a or 387a and nearby a trackpad for sensing a user tapping or pressing the base chassis exterior touch input top surface 364 or the base chassis sidewall situated nearest the known location of the trackpad may provide a location for sensing user tapping or pressing to click within the trackpad.

In other embodiments, a plurality of top capacitive sensor pads may be situated under a portion of the base chassis exterior touch input top surface 364 located nearest an input/output device that the user may adjust using a swiping gesture on a portion of the base chassis base chassis exterior touch input top surface 364 situated above the plurality of top capacitive sensor pads. For example, placement of a plurality of capacitive sensor pads within speaker touch input region 381 and nearby a speaker for sensing a user swiping across the base chassis exterior touch input top surface 364 or the base chassis sidewall situated nearest the known location of the speaker may provide a location for sensing user swiping across the plurality of top capacitive sensor pads to change the volume for the speaker, that is more intuitive to a user than a button or hotkey of a keyboard 352 currently used to control such a speaker. As another example, placement of a plurality of capacitive sensor pads within display touch input region 386 and nearby a digital display housed in display chassis 302 for sensing a user swiping across the base chassis exterior touch input top surface 364 or the base chassis sidewall situated nearest the known location of the display may provide a location for sensing user swiping across the plurality of top capacitive sensor pads to change the brightness of the display 386, that is more intuitive to a user than a button or hotkey of a keyboard 352 currently used to control such a display. As yet another example, placement of a plurality of capacitive sensor pads within trackpad touch input regions 382a and 387a and nearby a trackpad for sensing a user swiping across the base chassis exterior touch input top surface 364 or the base chassis sidewall situated nearest the known location of the trackpad may provide a location for sensing user swiping across the plurality of top capacitive sensor pads to move a cursor.

Firmware machine readable code instructions of a capacitive sensor driver to the capacitive sensor microcontroller in an embodiment may receive capacitive difference level changes from the operatively coupled network of the plurality of capacitive sensor pads situated beneath the IO device touch input regions 381, 382a, 383a, 384a, 385a and 386 to determine the input as a touch input on an IO device, or as a touchless gesture input above the locations on the base chassis exterior touch input top surface 364 with different capacitive sensor pads formed underneath. The machine readable code instructions of the capacitive sensor driver executes on the capacitive sensor microprocessor to process various types of user input via the base chassis exterior touch input top surface 364, as characterized by one or more detected capacitive change levels and characterized by location or movement across locations in the network of capacitive sensor pads, as IO input from the user for the hardware processor of the information handling system. If the detected capacitive change is at a first capacitive change level and detected at a particular location on the base chassis exterior touch input top surface 364, the capacitive sensor driver may relay the sensed change from the capacitive sensor microprocessor to the hardware processor for processing of a single tap or touch as input to software or firmware applications executing on the information handling system. Similarly, a second level of capacitive change or detection at plural capacitive sensor pads of motion from the touch input or touchless gesture input of a human finger moving may be detected at one or more capacitive sensor pads at a location of the base chassis exterior touch input top surface 364 to indicate a touchless input above the base chassis exterior touch input top surface 364 such that the capacitive sensor microprocessor executing the capacitive sensor driver may determine a gesture of the user in some embodiments. In an example embodiment, the second level of capacitive change may be lower or less than the first level of capacitive change associated with a touch or tap.

Following detection of user touch input at the base chassis exterior touch input top surface 364, the capacitive sensor microprocessor in an embodiment may execute machine readable code instructions of a capacitive sensor driver and a lid position based input location mapping engine to associate user input detected at one or more top capacitive sensor pads with user touch or gesture input for control of various input/output (IO) devices. The received touch input or touchless gesture input may be associated with user input for particular computing device control function inputs based on proximity of detecting top capacitive sensor pad to icons for those IO devices printed on the clamshell chassis, or location of IO devices within the clamshell chassis with respect to the sensing capacitive sensor pads and locations on the base chassis exterior touch input top surface 364. For example, the capacitive sensor microprocessor in an embodiment may execute machine readable code instructions to associate user input detected at one or more top capacitive sensor pads situated beneath the microphone touch input regions 383a and 384a with user touch or gesture input for control of the microphones, based on proximity of detecting top capacitive sensor pads to the microphone touch input regions 383a and 384a under icons for microphones printed on the clamshell chassis, or on known location of the microphones within the clamshell chassis with respect to the sensing capacitive sensor pads. As another example, the capacitive sensor microprocessor in an embodiment may execute machine readable code instructions to associate user input detected at one or more top capacitive sensor pads situated beneath the speaker touch input region 381 with user touch or gesture input for control of the speaker, based on proximity of detecting top capacitive sensor pads to the speaker touch input region 381 under an icon for the speaker printed on the clamshell chassis, or on a known location of the speaker within the clamshell chassis with respect to the sensing capacitive sensor pads. In still another example, the capacitive sensor microprocessor in an embodiment may execute machine readable code instructions to associate user input detected at one or more top capacitive sensor pads situated beneath the display touch input region 386 with user touch or gesture input for control of the digital display, based on proximity of detecting top capacitive sensor pads to the display touch input region 386 under an icon for the display printed on the clamshell chassis, or on a known location of the display within the clamshell chassis with respect to the sensing capacitive sensor pads.

In another example embodiment, the capacitive sensor microprocessor may execute machine readable code instructions to associate user input detected at one or more capacitive sensor pads situated beneath the antenna touch input region 385a with user touch or gesture input for control of the wireless antenna, based on proximity of detecting top capacitive sensor pads to the antenna touch input region 385a under an icon for the antenna printed on the clamshell chassis, or on a known location of the antenna within the clamshell chassis with respect to the sensing capacitive sensor pads. In yet another example, the capacitive sensor microprocessor in an embodiment may execute machine readable code instructions to associate user input detected at one or more capacitive sensor pads situated beneath the trackpad touch input regions 382a and 387a with user touch or gesture input for control of the trackpad, based on proximity of detecting top capacitive sensor pads to the trackpad touch input regions 382a and 387a on known location of the trackpad within the clamshell chassis with respect to the sensing capacitive sensor pads.

Firmware for an IO device in an embodiment may then execute the IO device command associated with the identified user touch or gesture input as determined by the capacitive sensor driver executing on the capacitive sensor microprocessor. For example, in an embodiment in which a detected user input comprises user touch input or user touchless gesture input within the microphone touch input region 383*a* or 384*a*, firmware for the microphone may execute an IO device command to mute or unmute the microphone or adjust volume of the microphone. In another example, in an embodiment in which a detected user input comprises user touch input or user touchless gesture input within the speaker touch input region 381, firmware for the speaker may execute an IO device command to increase or decrease volume for the speaker. In yet another example, in an embodiment in which a detected user input comprises user touch input or user touchless gesture input within the display touch input region 386, firmware for the display may execute an IO device command to increase or decrease brightness for the display. In still another example, in an embodiment in which a detected user input comprises user touch input or user touchless gesture input within the antenna touch input region 385*a*, firmware for the antenna may execute an IO device command to activate or deactivate the antenna. In still another example, in an embodiment in which a detected user input comprises user touch input or user touchless gesture input within the trackpad touch input region 382*a* or 387*a*, firmware for the trackpad may execute an IO device command to click or move a cursor.

Figure 3B:
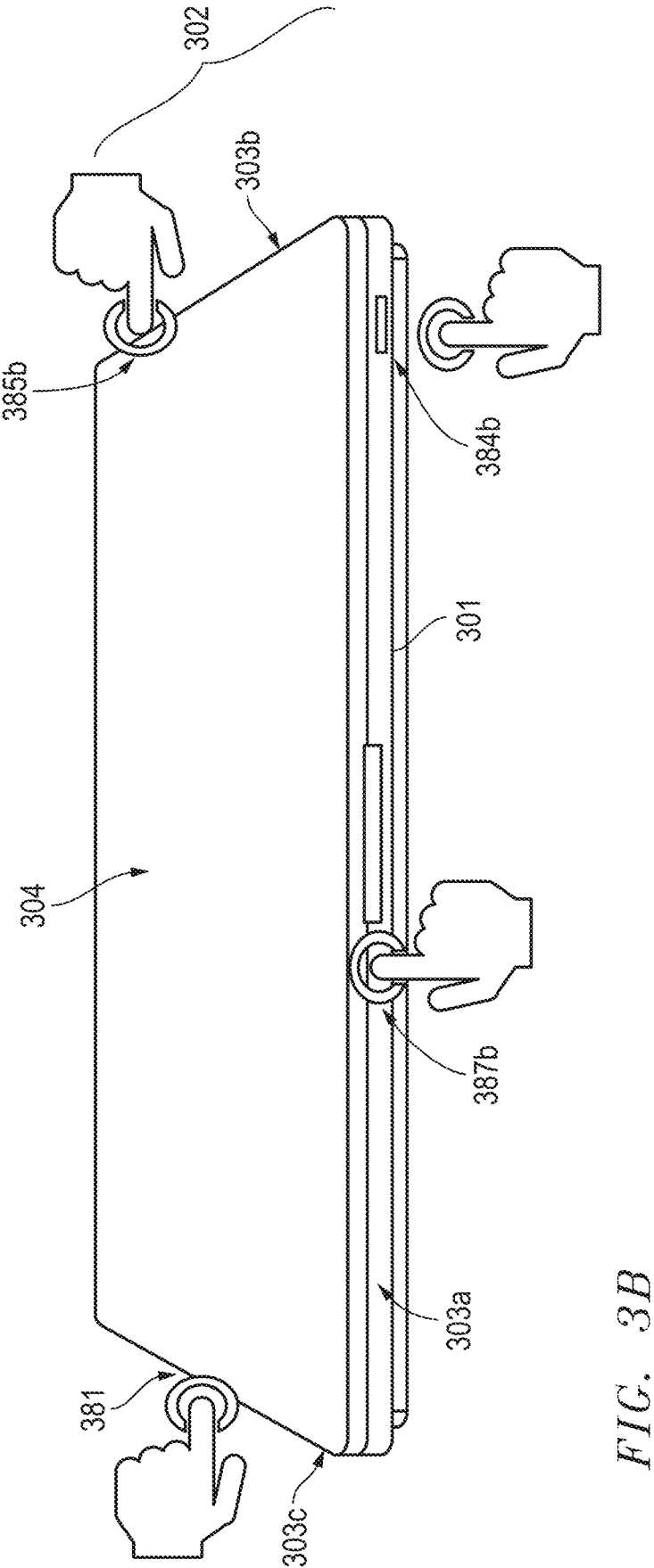
FIG. 3B is a graphic diagram illustrating a base chassis of an information handling system placed in a closed configuration having a plurality of IO device touch input regions of base chassis sidewall input surfaces at which capacitive sensor pads sealed within the base chassis sense user touch input or touchless gesture input according to an embodiment of the present disclosure.

FIG. 3B is a graphic diagram illustrating a base chassis of an information handling system placed in a closed configuration having a plurality of input/output (IO) device touch input regions of a base chassis sidewall input surface at which capacitive sensor pads disposed internal to the sidewalls of the base chassis may sense user touch input or user touchless gesture input according to an embodiment of the present disclosure. As described in embodiments herein, the touch input sensing hardware structure formed under the base chassis exterior touch input top surface (e.g., 261 of FIG. 2) and internal to the base chassis sidewall touch input surfaces 303*a*, 303*b*, or 303*c* may also include an active shielding layer which may be operatively coupled to a capacitive sensor microprocessor and PMU to be supplied a voltage level to shield the plurality of capacitive sensor pads from a grounding source. The active shielding pads may reduce parasitic capacitance grounding between the capacitive sensor pads and a grounding layer placed below the active shielding layer by requiring the capacitive fields of the capacitive sensor pads to go around the active shielding pads to reach the grounding layer. Thus, these active shielding pads of the active shielding layer improve signal-to-noise ratio and extend the sensing range of the plurality of capacitive sensor pads on the capacitive pads layer such as for detecting lower capacitive change levels, for example, that may be associated with gesture inputs hovering above the base chassis exterior touch input top surface, or touch inputs at the base chassis sidewall touch input surfaces 303*a*, 303*b*, or 303*c*, or even an exterior surface 304 of the display chassis 302 when the clamshell chassis is placed in a closed configuration. Indeed, in an embodiment, the active shielding pads allow a user to provide input, such as gesture input, even when the user is not in physical contact with any touch input surfaces (e.g., 303*a*, 303*b*, 303*c*, or 261 of FIG. 2) of the base chassis 301 or allows detection of user input at or above the display lid chassis 302, which may be detected as a capacitive change from the capacitive sensor pads. This is because the capacitive sense capabilities of the capacitive sensor pads is extended a distance above the outer chassis touch input surfaces 261, 302*a*, 302*b*, 302*c*, and 304 due to the inclusion of the shielding pads of the active shielding layer limiting the parasitic capacitive grounding of the capacitive fields of the capacitive sensor pads.

In an embodiment, at least one side capacitive sensor pad may be situated beside an internal to a surface portion of a base chassis sidewall touch input surface 303*a*, 303*b*, or 303*c*, located nearest an input/output device that the user may turn on or off using a single touch on a portion of a base chassis sidewall touch input surface 303*a*, 303*b*, or 303*c*. and detected by at least one capacitive sensor pad internal to the side wall surface. For example, placement of a capacitive sensor pad within microphone touch input region 384*b* on base chassis sidewall touch input surface 303*c* and nearby a microphone for sensing a user tapping or pressing the base chassis sidewall touch input surface 303*c* situated nearest the known location of the microphone may provide a location for sensing user tapping or pressing to mute or unmute the microphone or a swiping touch input to adjust volume of the microphone that is more intuitive to a user than a button or hotkey of a keyboard currently used to control such a microphone. In another example, placement of a capacitive sensor pad within the antenna touch input regions 385*b* on base chassis sidewall touch input surface 303*b* and nearby an antenna for sensing a user tapping or pressing the base chassis sidewall touch input surface 303*b* situated nearest the known location of the antenna may provide a location for sensing user tapping or pressing to activate or deactivate the antenna that is more intuitive to a user than a button or hotkey of a keyboard currently used to control such an antenna. In yet another example, placement of a capacitive sensor pad within the trackpad touch input region 387*b* on base chassis sidewall touch input surface 303*a* and nearby a trackpad for sensing a user tapping or pressing the base chassis sidewall touch input surface 303*a* situated nearest the known location of the trackpad may provide a location for sensing user tapping or pressing to click within the trackpad.

In another embodiment, a plurality of side capacitive sensor pads may be situated beside and internal to a surface portion of a base chassis sidewall touch input surface 303*a*, 303*b*, or 303*c* located nearest an input/output device that the user may adjust using a swiping gesture on a portion of a base chassis sidewall situated beside the plurality of side capacitive sensor pads. For example, placement of a plurality of capacitive sensor pads within speaker touch input region 381 and nearby a speaker for sensing a user swiping across the base chassis sidewall touch input surface 303*c* situated nearest the known location of the speaker may provide a location for sensing user swiping across the plurality of side capacitive sensor pads to change the volume for the speaker, that is more intuitive to a user than a button or hotkey of a keyboard currently used to control such a speaker. As another example, placement of a plurality of capacitive sensor pads within trackpad touch input region 387*b* on base chassis sidewall touch input surface 303*a* and nearby a trackpad for sensing a user swiping across the base chassis sidewall touch input surface 303*a* situated nearest the known location of the trackpad may provide a location for sensing user swiping across the plurality of side capacitive sensor pads to move a cursor.

Following detection of user touch input at the base chassis sidewall touch input surface 303*a*, 303*b*, or 303*c*, the capacitive sensor microprocessor in an embodiment may execute machine readable code instructions of a capacitive sensor driver and a lid position based input location mapping engine to associate user input detected at one or more side capacitive sensor pads with user touch or gesture input for control of various input/output (IO) devices, based on prox-imity of detecting side capacitive sensor pad to icons for those IO devices printed on the clamshell chassis, or location of IO device within the clamshell chassis with respect to the sensing capacitive sensor pads at the location of the base chassis sidewall touch input surface 303*a*, 303*b*, or 303*c*. For example, the capacitive sensor microprocessor in an embodiment may execute machine readable code instruc-tions to associate user input detected at one or more side capacitive sensor pads situated beside and internal to the speaker touch input region 381 with user touch or gesture input for control of the speaker, based on proximity of detecting side capacitive sensor pads to the speaker touch input region 381 under an icon for the speaker printed on the clamshell chassis, or on a known location of the speaker within the clamshell chassis with respect to the sensing capacitive sensor pads. As another example, the capacitive sensor microprocessor in an embodiment may execute machine readable code instructions to associate user input detected at one or more side capacitive sensor pads situated beside and internal to the microphone touch input region 384*b* with user touch or gesture input for control of the microphone, based on proximity of detecting side capacitive sensor pads to the microphone touch input region 384*b* under an icon for the microphone printed on the clamshell chassis, or on a known location of the microphone within the clamshell chassis with respect to the sensing capacitive sensor pads. In yet another example, the capacitive sensor microprocessor in an embodiment may execute machine readable code instructions to associate user input detected at one or more side capacitive sensor pads situated beside and internal to the antenna touch input region 385*b* with user touch or gesture input for control of the antenna, based on proximity of detecting side capacitive sensor pads to the antenna touch input region 385*b* under an icon for the antenna printed on the clamshell chassis, or on a known location of the antenna within the clamshell chassis with respect to the sensing capacitive sensor pads. In still another example, the capacitive sensor microprocessor in an embodiment may execute machine readable code instruc-tions to associate user input detected at one or more side capacitive sensor pads situated beside and internal to the trackpad touch input region 387*b* with user touch or gesture input for control of the trackpad, based on proximity of detecting side capacitive sensor pads to the trackpad touch input region 387*b* under an icon for the trackpad printed on the clamshell chassis, or on a known location of the trackpad within the clamshell chassis with respect to the sensing capacitive sensor pads.

Firmware for an IO device may then execute the IO device command associated with the identified user touch or gesture input as determined by the capacitive sensor micro-processor executing machine readable code instructions of the capacitive sensor driver for capacitive sensor pads associated with the touch input surface regions. For example, in an embodiment in which a detected user input comprises user touch input or user touchless gesture input within the microphone touch input region 384*b*, firmware for the microphone may execute an IO device command to mute or unmute the microphone or a swiping touch input to adjust volume of the microphone. In another example, in an embodiment in which a detected user input comprises user touch input or user touchless gesture input within the speaker touch input region 381, firmware for the speaker may execute an IO device command to increase or decrease volume for the speaker. In still another example, in an embodiment in which a detected user input comprises user touch input or user touchless gesture input within the antenna touch input region 385*b*, firmware for the antenna may execute an IO device command to activate or deactivate the antenna. In still another example, in an embodiment in which a detected user input comprises user touch input or user touchless gesture input within the trackpad touch input region 387*b*, firmware for the trackpad may execute an IO device command to click or move a cursor.

Figure 3C:
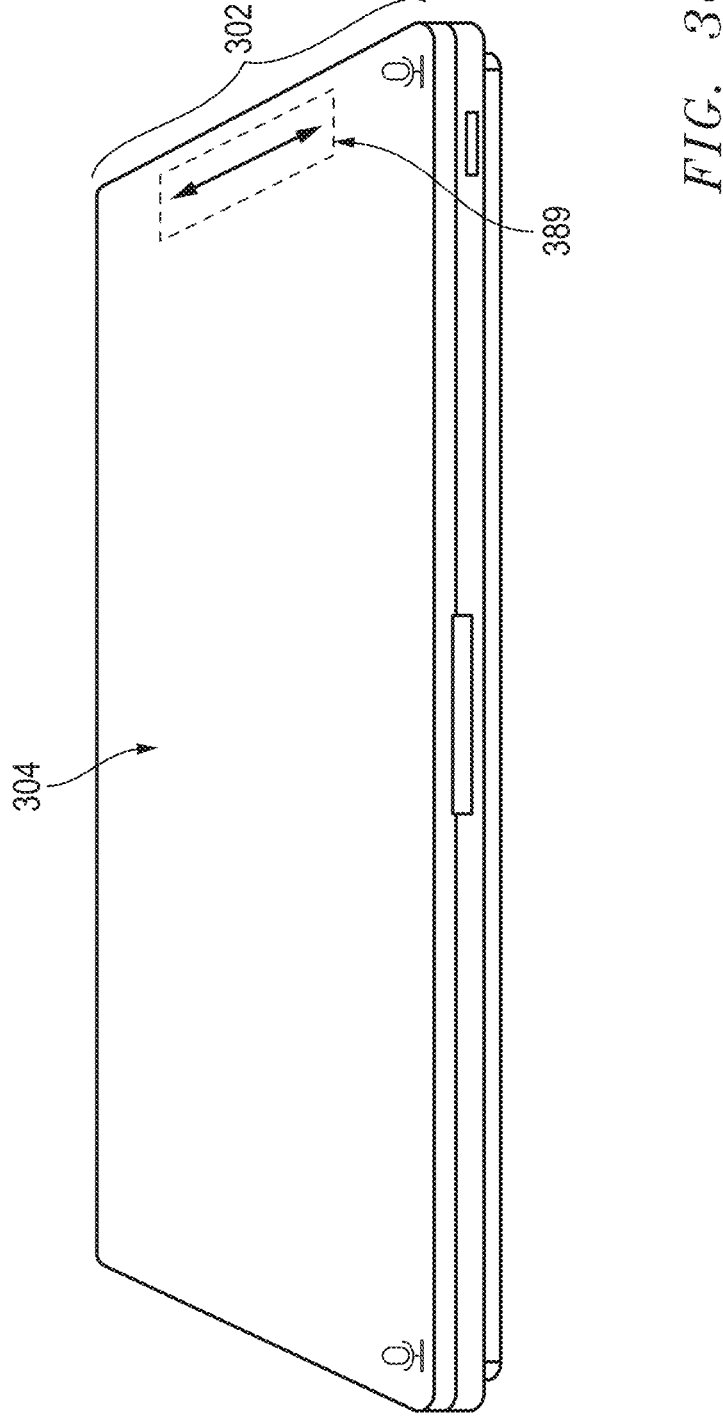
FIG. 3C is a graphic diagram illustrating a clamshell chassis placed in a closed configuration having an IO device touch input region of display chassis lid input surfaces at which capacitive sensor pads sealed within the base chassis sense user touch input or touchless gesture input at the top surface of a display lid chassis according to an embodiment of the present disclosure.

FIG. 3C is a graphic diagram illustrating a clamshell chassis of an information handling system placed in a closed configuration having an input/output (IO) device touch input region of a display chassis lid input surface at which capacitive sensor pads disposed within a base chassis may sense user input at the top surface of a display chassis, which may act as a display chassis lid input surface 304 in the form of touch, swipe, or contactless gesture according to an embodiment of the present disclosure. As described herein, active shielding pads of the active shielding layer in an embodiment may improve signal-to-noise ratio and extend the sensing range of the plurality of capacitive sensor pads on the capacitive pads layer, such as for detecting lower capacitive change levels, for example, that may be associ-ated with an exterior surface 304 of the display chassis 302 when the clamshell chassis is placed in a closed configura-tion. In some embodiments, a strain gauge may be disposed beneath the display chassis lid input surface 304 of the display chassis 302, beneath an IO device touch input region 389, in order to better gauge and confirm whether the user is actually touching the display chassis 302 rather than providing a touchless gesture input. This may assist in distinguishing between a touch input at the display chassis lid input surface 304 or a touchless gesture input.

The capacitive sensor microprocessor in some embodi-ments may execute machine readable code instructions of strain gauge firmware to detect deflection of display chassis exterior surface under downward force applied by user as an input gesture. As described herein, machine readable code instructions of a capacitive sensor driver executes on the capacitive sensor microprocessor to process various types of user input via the base chassis exterior touch input top surface (e.g., 261 of FIG. 2), as characterized by one or more detected capacitive change levels and characterized by loca-tion or movement across locations of plural capacitive sensor pads, as IO input from the user for the hardware processor of the information handling system. If the detected capacitive change is at a first capacitive change level, the capacitive sensor driver may relay the sensed change from the capacitive sensor microprocessor to the hardware pro-cessor for processing of a single tap or touch as input to software or firmware applications executing on the infor-mation handling system. Similarly, a second level of capaci-tive change or detection across plural capacitive sensor pads of the presence of motion from the touch input or touchless gesture input of a human finger detected at one or more capacitive sensor pads may indicate a touchless input above the base chassis exterior touch input top surface (e.g., 261 of FIG. 2) such that the capacitive sensor microprocessor executing the capacitive sensor driver may determine a gesture of the user in some embodiments. In an example embodiment, the second level of capacitive change may be lower or less than the first level of capacitive change associated with a touch or tap. Even if the user touches the IO device touch input region 389 in an embodiment, the capacitive sensor pads beneath the base chassis exterior touch input top surface 261 may register such a touch as the second level of capacitive change, normally associated with a gesture rather than a touch input, due to the distance between the base chassis exterior touch input top surface 261 housing the capacitive sensor pads and the IO device touch input region 389. In such a case, receiving an indication from a strain gauge disposed beneath the IO device touch input region 389 that the user has provided downward force within that region 389 as well as detection of the closed position may allow the lid position based input location mapping engine to identify the detected second capacitance change as a touch rather than a gesture.

Figure 4:
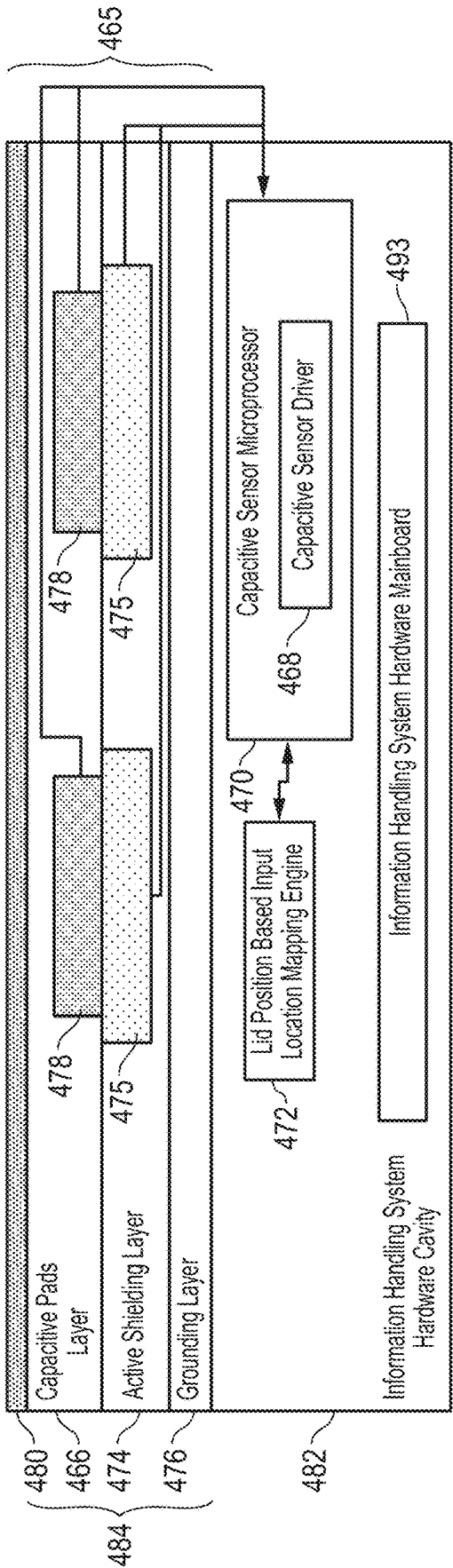
FIG. 4 is a graphic diagram illustrating a touch input sensing hardware structure stack that includes capacitive sensor pads to receive user input contactlessly at the capacitive sensor pads operatively coupled to a capacitive sensor microprocessor, an active shielding layer, and a ground layer according to an embodiment of the present disclosure.

FIG. 4 is a graphic and block diagram illustrating a touch input sensing hardware structure stack that includes capacitive sensor pads formed under or internal to a base chassis exterior touch input top surface to receive user input contactlessly at the capacitive sensor pads operatively coupled to a capacitive sensor microprocessor, an active shielding layer, and a ground layer according to an embodiment of the present disclosure. As described herein, an information handling system may be housed in a clamshell type chassis, such as a laptop computer, having a base chassis that houses IO devices, and a touch input sensing hardware structure 465 that senses capacitive changes in capacitive sensor pads 478 of a capacitive pads layer 466 disposed beneath or internal to the base chassis touch input surface of the base chassis, such as a base chassis exterior touch input top surface 480, as a user interacts with that base chassis touch surface through touch or by hovering a finger or portion of a hand just above that base chassis touch input surface. In some embodiments, such as that shown in FIG. 4, this chassis touch input surface of the base chassis through which the capacitive sensor pads 478 of the capacitive pads layer 466 may sense such user touch input may include a base chassis exterior touch input top surface 480 of the base chassis and may include locations that surround a mechanical keyboard or trackpad (e.g., as described with respect to FIG. 2A).

As described herein, in some embodiments, the top outer surface of the base chassis through which the capacitive sensor pads 478, that are sealed underneath or within, may sense user touch input may comprise the designated base chassis exterior touch input top surface 480 of the base chassis and may be any location on the base chassis such as those surface portions that surround a keyboard or a touchpad in the base chassis. In such an embodiment, the base chassis of the information handling system may include a base chassis exterior touch input top surface 480 disposed above or external to a touch input sensing hardware structure 465 formed under and sealed within the base chassis exterior touch input top surface 480 in embodiments herein. This base chassis exterior touch input top surface 480 may be disposed atop the embedded touch input sensing hardware structure 465 at various location across the base chassis and include capacitive sensing technologies with capacitive sensor pads 478 of a capacitive pads layer 466 that detect presence, touch, and movement of user fingers or portions of the user's hands made on or just above the top base chassis exterior touch input top surface 480 in embodiments herein. In further embodiments, the embedded touch input sensing hardware structure 465 disposed beneath the top base chassis exterior touch input top surface 480 may be active when a display lid chassis is in an open position and inactive when the display lid chassis is in a closed position pursuant to execution of machine readable code instructions of a lid position based input location mapping engine 472 according to some embodiments.

Capacitive sensor pads 478 of the capacitive pads layer 466, an active shielding layer 474, and grounding layer 476 of the touch input sensing hardware structure 465 formed under the base chassis exterior touch input top surface 480 may be formed, for example, on a flexible PCB 484 circuit. For example, the plurality of capacitive sensor pads 478 formed on or at the top surface of this flexible PCB 484 circuit. In an embodiment, the capacitive sensor pads 478 may include patches of deposited carbon on the flexible PCB circuit 484 configured to vary an electric field in response to changes in nearby capacitance. These carbon-based patches may be arranged in a sensor matrix and, during manufacturing, may be printed, spattered, or otherwise deposited on the flexible PCB 484 circuit. In an embodiment, the array of deposited carbon patches may be arranged such that one or more IO device touch input regions (e.g., as described above with respect to FIGS. 3A, 3B, and 3C) aligns vertically above the base chassis exterior touch input top surface 480 and a deposited capacitive sensor pad 478 (e.g., carbon patch) formed thereunder.

As described herein, each of the capacitive sensor pads 478 of the capacitive pads layer 466 may be operative coupled to the capacitive sensor microprocessor 470 executing machine readable code instructions of a capacitive sensor driver 468. In an embodiment, each of the capacitive sensor pads 478 that form the plurality of capacitive sensors within the capacitive pads layer 466 may be operatively coupled to the capacitive sensor microprocessor 470 via carbon traces formed on a surface such as a PCB or a flexible PCB circuit 484 in embodiments described herein. It is also appreciated that other types of traces may be formed to operatively couple the carbon pads of capacitive sensor pads 478 to the capacitive sensor microprocessor 470, such as copper traces, silver traces, or indium tin oxide (ITO), that allow each of the carbon pads of the capacitive sensor pads 478 to conduct signals to the capacitive sensor microprocessor 470 for detection and determination of user input by the execution of the capacitive sensor driver 468. Detection of changes in capacitance at various levels of capacitance change are detected by the capacitive sensor microprocessor 470 and determined by the execution of the capacitive sensor driver 468 as indicative of a user's touch inputs, or a user's touchless gesture inputs at or near the IO device touch input regions of the base chassis exterior touch input top surface 480. The capacitive sensor driver 468 may be executed by the capacitive sensor microprocessor 470 to detect and determine which of the plurality of IO device touch input regions (e.g., as described with respect to FIGS. 3A, 3B, and 3C) on the base chassis exterior touch input top surface 480 have been pressed and detected at corresponding capacitive sensor pads 478. The capacitive sensor microprocessor 470 executing machine readable code instructions of the capacitive sensor driver 468 for processing of touch input may relay those inputs received at each of the capacitive sensor pads 478 from the capacitive sensor microprocessor 470 to the information handling system hardware mainboard 493 in the information handling system hardware cavity 482. Relay of those touch inputs, or touchless gesture inputs detected at the capacitive sensor microprocessor 470 are provided as input to any hardware processor on the information handling system hardware mainboard 493 as input to the information handling system executing one or more software or firmware applications.

The capacitive pads layer 466 may be part of the flexible PCB 484 that also includes the active shielding layer 474 and the grounding layer 476. In an embodiment, the touch input sensing hardware structure 465 may also include an active shielding layer 474 which may be operatively coupled to a capacitive sensor microprocessor 470 and a power source, such as from a PMU, to be supplied a voltage level to shield the plurality of capacitive sensor pads 478 from parasitic capacitive grounding to a grounding source such as a grounding layer 476 of the touch input sensing hardware structure 465. The active shielding pads 475 may reduce parasitic capacitance grounding between the capacitive sensor pads 478 and a grounding layer 476 placed below the active shielding layer 474 by requiring the capacitive fields of the capacitive sensor pads 478 to go around the active shielding pads 478 to reach the grounding layer 476. Thus, these active shielding pads 475 of the active shielding layer 478 improve signal-to-noise ratio and extend the sensing range of the plurality of capacitive sensor pads 478 on the capacitive pads layer 466 such as for detecting lower capacitive change levels, for example, that may be associated with gesture inputs hovering above the base chassis exterior touch input top surface 480, or touch inputs at the base chassis sidewall touch input surface or even an exterior surface of the display lid chassis when the clamshell chassis is placed in a closed configuration. Indeed, in an embodiment, the active shielding pads 475 allow a user to provide input, such as gesture input, even when the user is not in physical contact with any surfaces of the base chassis or allows detection of user input at or above the display lid chassis, which may be detected as a capacitive change from the capacitive sensor pads 478. This is because the capacitive sense capabilities of the capacitive sensor pads 478 is extended a distance above the outer chassis surfaces due to the inclusion of the shielding pads 475 of the active shielding layer 474 limiting the parasitic capacitive grounding of the capacitive fields of the capacitive sensor pads 478.

The active shielding layer 474 may include a plurality of shielding pads 475 that are formed vertically below each of the capacitive sensor pads or distributed as a single area across portions of a plurality of the capacitive sensor pads 478 within the active shielding layer 474 and between the capacitive sensor pads 478 and a grounding layer 476. During normal operation of the capacitive sensor pads 478, a capacitive pads microprocessor 470 in an embodiment may execute machine readable code instructions of capacitive pads driver 468 firmware to place an active shielding layer 474 of the chassis touch input sensing hardware structure 465 in a default shielding state. In such a state, each of the shielding pads 475 of the active shielding layer 474 may shield the plurality of capacitive sensors within the capacitive pads layer 466 from parasitic grounding by the nearby grounding layer 476 formed at the bottom of the flexible PCB 484. The grounding layer 476 provides EMI shielding of information handling system hardware components in the information handling system hardware cavity 482 of the base chassis such as those operating on the information handling system hardware mainboard 493 and described in further detail above with reference to FIG. 1 as well as a grounding source for the electronics of the touch input hardware sensing structure 465. As described, the grounding layer 476 may be formed directly below the active shielding layer 474 and forms a bottom-most layer of the flexible PCB 484.

It is appreciated that the flexible PCB 484 may form an upper portion of the base chassis of the information handling system just under the base chassis exterior touch input top surface 480 that may form a top surface for the chassis housing of the base chassis of the information handling system. However, the base chassis portion of the information handling system also includes the information handling system hardware cavity 482. The information handling system hardware cavity 482 may be present to provide space that other hardware component devices such as the hardware processor (e.g., FIG. 1, 102), memory devices, PMU, radiofrequency adapters, or wired ports to name a few of those hardware component devices that may be formed into the information handling system hardware cavity 482. As shown in FIG. 4, for example, the information handling system hardware cavity 482 may house an information handling system hardware mainboard 493 which may include a PCB that houses the hardware processor, other processing devices (e.g., FIG. 1, 102, 104, 106, 108, 110), the PMU, the wireless interface adapter, the radio, the RF front end, and the antenna among other hardware components.

Figure 5:
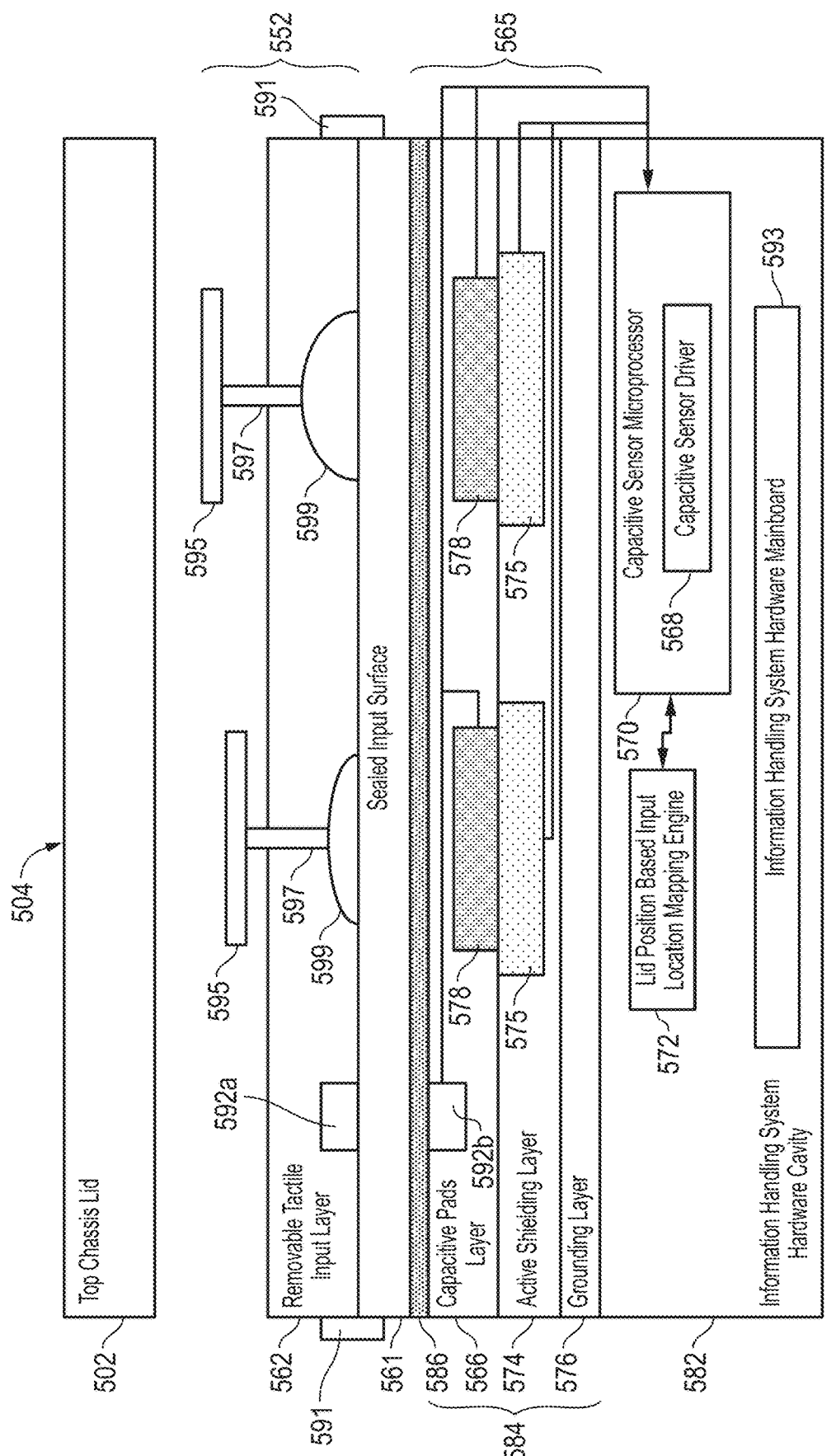
FIG. 5 is a graphic diagram illustrating a touch input stack structure operating as a touch input sensing hardware structure stack that includes a removable tactile input layer and a separate chassis touch input sensing hardware structure to receive user input contactlessly at capacitive sensor pads from touch input on a top touch input surface of a display lid chassis according to an embodiment of the present disclosure.

FIG. 5 is a graphic diagram illustrating a split-keyboard structure stack operating as a touch input sensing hardware structure stack that includes a removable tactile input layer and a separate chassis touch input sensing hardware structure to receive user input contactlessly at capacitive sensor pads from touch input on a top touch input surface of a display lid chassis according to an embodiment of the present disclosure. As described herein, the split-keyboard structure stack up includes a keyboard structure 552 as part of a removable tactile input layer 562 and may further include a number of separate layers that form the chassis touch input sensing hardware structure 565 formed under a sealed input surface 561, and used to sense user touch inputs to a display lid chassis touch input surface 504 in a closed position of the clamshell information handling system chassis in an example embodiment.

As also described herein, the top surface of the base chassis through which capacitive sensor pads may sense user touch input may be formed as a sealed input surface 586 upon which a removable tactile input layer 562 such as an interchangeable keyboard may be disposed. In such an embodiment, a keyboard may be used with a laptop-type information handling system that includes a split keyboard type design with a purely mechanical removable tactile input layer 562 that may include keyboard keys 595 that a user may use to provide input to the laptop-type information handling system. The laptop-type information handling system in the present specification also includes a base chassis touch input surface with a chassis touch input sensing hardware structure 565 or keyboard sensing hardware structure 584 formed under the chassis touch input surface that is separate from the removable tactile input layer 562 is the sealed input surface 561 or on top of the sealed input surface 561 in some embodiments, such as that described above with respect to FIG. 4. In both an embodiment with a traditional keyboard and base chassis exterior touch input top surface and in an embodiment with the split keyboard type design as shown in FIG. 5, the same capacitive sensing technologies in the chassis touch input sensing hardware structure 565 or keyboard sensing hardware structure 584 may be used to allow for sensing of user touch or gesture on or nearby a base chassis sidewall (e.g., left wall, right wall, front wall, rear wall) or user touch on a display lid chassis touch input surface 504 with the display lid chassis 502 is in a closed position as well as keypress inputs, touch inputs, or touchless gesture inputs on the removable tactile input layer 562 and keyboard 552.

The chassis touch input sensing hardware structure 565 or keyboard sensing hardware structure 584 includes interface detection electronics, such as capacitive sensing pads 578, and operates to contactlessly detect user input received on or above the removable tactile input layer 562 through which the user may provide input into the information handling system. The removable tactile input layer 562 may be that layer that a user interacts with via keypress of mechanical keyboard keys 595 of keyboard structure 552, touch input, or touchless gesture input above to provide input to the information handling system. This removable tactile input layer 562 may include only mechanical elements such as mechanical keyboard keys 595 of keyboard structure 552 formed into a grid, frame, or tray support structure of suitable material, such as plastic or ABS, to provide tactile response to the user when the mechanical keyboard keys 595 are pressed. In a specific example, the removable tactile input layer 562 may include a keycap or keyboard key 595 that includes a keyboard key post 597. The keyboard key 595 and keyboard key post 597 may be operatively and mechanically coupled to a keyboard key rubber dome 599 or popple. In this example embodiment, instead of the keyboard key rubber dome 599 having a switch or activating a switch on a PCB, the keyboard key rubber dome 599 may be used to help provide tactile feedback to the user such that the mechanical features imitate typical interactions with other types of keyboards. In some example embodiments, the removable tactile input layer 562 may also include scissor or butterfly arms (not shown) that also provide tactile feedback to the user while facilitating the recoil of the keyboard key 595 and keyboard key post 597 upwards for the keyboard structure 552. Thus, in the removable tactile input layer 562 provides a simulated tactile feel to the user such that the user may feel when actuating the keys on any keyboard, however the removable tactile input layer 562, which may include the keyboard structure 552, may be easily replaced without replacement of keyboard electronics should damage occur to any of the keyboard keys 595.

Thus, the removable tactile input layer 562 does not include any electrical elements that are used to receive electrical signals as the user presses the keyboard keys 595 and no electrical connection to internal hardware that receives user inputs from the chassis touch input sensing hardware structure. Therefore, in the embodiments herein, the removable tactile input layer 562 does not include a PCB layer, a flexible PCB layer, contact switches or other electrical keypress detectors, or other electrical components that other keyboards may use to detect the press of a key by the user. Instead, in the embodiments herein, any number of removable tactile input layers 562, which may include a keyboard structure 552 without electrical keyboard components in some embodiments, operate with a separate chassis touch input sensing hardware structure 565 formed under the sealed interface surface 561 that includes interface detection electronics, such as capacitive sensing pads, that can contactlessly detect user input.

In one embodiment shown in FIG. 5, the removable tactile input layer 562 may be coupled to the capacitive pads layer 566 using reciprocal removable tactile input layer coupling system structures 591 on the sealed input layer 561 (or base chassis) and on the removable tactile input layer 562. In embodiments herein, the reciprocal removable tactile input layer coupling system structures 591 may include reciprocal latching mechanisms, reciprocal interference fit structures, reciprocal magnetic devices, or other coupling devices that allows user to couple and decouple the removable tactile input layer 562 to the sealed input layer 561 or the base chassis. This reciprocal removable tactile input layer coupling system structures 591 such as reciprocal latching mechanism structures, reciprocal interference fit structures, reciprocal magnetic devices, or other coupling structures allow a user to quickly decouple the removable tactile input layer 562 from the sealed input surface 561 in order to repair or replace the removable tactile input layer 562 as described herein. In an example embodiment, this reciprocal removable tactile input layer coupling system structures 591 may be a reciprocal latching mechanism that may include small, molded tabs integrated into the removable tactile input layer 562 that engage with matching recesses, slots, or holes formed in the sealed input surface 561 or on the base chassis. It is appreciated that other mechanical devices or mechanical structures may be used to selectively secure the removable tactile input layer 562 to the sealed input surface 561 including rotational latches, magnetic latching mechanisms, hook-and-slot latches, slide locking latches, interference fit grooves or extensions on the perimeter of tray or grid of the removable tactile input layer 562 that interference fit with a frame or edge of the sealed input surface 561, and other latching or interference fit structures.

In an alternative example embodiment, the removable tactile input layer 562 may be installed onto and operatively coupled to the sealed input surface 561 using or an adhesive layer (not shown). This adhesive layer may include any type of glue, tape, or other adhesive that may, at least temporarily, adhere a bottom surface of the removable tactile input layer 562 to a top surface of the sealed input surface 561 that includes the chassis touch input sensing hardware structure 565 formed under the sealed input surface 561. In another embodiment, the removable tactile input layer 562 includes a removable tactile input layer support structure, such as a tray or frame made of plastic or other suitable material, that includes a latch or a latch receiver along one or more sides of the removable tactile input layer support structure edge, edges, or bottom surface to provide for latching structure interface with a reciprocal structure to operably couple the removable tactile input layer 562 to the sealed input surface 561 of the chassis, such as a base chassis, of the information handling system. The removable tactile input layer 562 is installed via the latch or other fastener device into a reciprocal latch structure or fastener of the sealed input surface 561 of the chassis of the information handling system. In yet another embodiment, the removable tactile input layer 562 includes a removable tactile input layer support structure, such as a tray or frame made of plastic or other suitable material, that includes a magnet or magnetic structure along a side or bottom surface of the removable tactile input layer support structure to provide for an magnetic interaction with a reciprocal magnet or magnetic structure to operably couple the removable tactile input layer 562 to the sealed input surface 561 of the chassis, such as a base chassis, of the information handling system. The removable tactile input layer 562 is installed via magnetic attachment between it and a reciprocal magnet or magnetic structure of the sealed input surface 561 of the chassis of the information handling system. In yet another embodiment, the removable tactile input layer 562 may be operatively coupled to the sealed input surface 561 using an adhesive layer. This adhesive layer may include any type of glue, tape, or other adhesive that may, at least temporarily, adhere a bottom surface of the removable tactile input layer 562 to a top surface of the sealed input surface 561 of the chassis of the information handling system.

As described herein, a separate half of the split-keyboard structure includes the chassis touch input sensing hardware structure 565 formed under the sealed input surface 561. The chassis touch input sensing hardware structure 565 formed under the sealed input surface 561 includes, as a top layer, the capacitive pads layer 566. The sealed input surface 561 prevents contaminants and liquids from entering into the remaining portions of the keyboard housing or base chassis of the information handling system. The sealed input surface 561 protects the electronics, such as carbon capacitive sensing pads and circuitry, of the chassis touch input sensing hardware structure 565 formed under the sealed input surface 561 as well as protecting hardware components, such as a motherboard, hardware processors, memory and other hardware components as described with reference to FIG. 1, that are disposed in the base chassis of the information handling system. This capacitive pads layer 566, an active shielding layer 574, and grounding layer 576 of the chassis touch input sensing hardware structure 565 formed under the sealed input surface 561 may be formed, for example, on a flexible PCB 584 circuit with a plurality of capacitive sensor pads 578 formed on or at the top surface of this flexible PCB 584 circuit. In an embodiment, the capacitive sensor pads 578 may include patches of deposited carbon on the flexible PCB circuit 584 configured to vary an electric field in response to changes in nearby capacitance. These carbon-based patches may be arranged in a sensor matrix and, during manufacturing, may be printed, spattered, or otherwise deposited on the flexible PCB 584 circuit. In an embodiment, the array of deposited carbon patches may be arranged such that each key of the removable tactile input layer 562 or one or more IO device touch input regions (e.g., as described above with respect to FIGS. 3A, 3B, and 3C) aligns vertically above the sealed input surface 561 and a deposited capacitive sensor pad 578 (e.g., carbon patch) formed thereunder.

As described herein, each of the capacitive sensor pads 578 of the capacitive pads layer 566 may be operative coupled to the capacitive sensor microprocessor 570 executing machine readable code instructions of a capacitive sensor driver 568. In an embodiment, each of the capacitive sensor pads 578 that form the plurality of capacitive sensors within the capacitive pads layer 566 may be operatively coupled to the capacitive sensor microprocessor 570 via carbon traces formed on a surface such as a PCB or a flexible PCB circuit 584 in embodiments described herein. It is also appreciated that other types of traces may be formed to operatively couple the carbon pads of capacitive sensor pads 578 to the capacitive sensor microprocessor 570, such as copper traces, silver traces, or indium tin oxide (ITO), that allow each of the carbon pads of the capacitive sensor pads 578 to conduct signals to the capacitive sensor microprocessor 570 for detection and determination of user input by the execution of the capacitive sensor driver 568. Detection of changes in capacitance at various levels of capacitance change are detected by the capacitive sensor microprocessor 570 and determined by the execution of the capacitive sensor driver 568 as indicative of a user's keypress inputs, a user's touch inputs, or a user's touchless gesture inputs at or near the keyboard keys 595 or other input surfaces of the keyboard structure 552 or the removable tactile input layer 562. The capacitive sensor driver 568 may be executed by the capacitive sensor microprocessor 570 to detect and determine which of the plurality of keyboard keys 595 or IO device touch input regions (e.g., as described with respect to FIGS. 3A, 3B, and 3C) on the removable tactile input layer 562 have been pressed and detected at corresponding capacitive sensor pads 578. The capacitive sensor microprocessor 570 executing machine readable code instructions of the capacitive sensor driver 568 for processing of keystrokes or touch input may relay those inputs received at each of the capacitive sensor pads 578 from the capacitive sensor microprocessor 570 to the information handling system hardware mainboard 593 in the information handling system hardware cavity 582. Relay of those keypress inputs, touch inputs, or touchless gesture inputs detected at the capacitive sensor microprocessor 570 are provided as input to any hardware processor on the information handling system hardware mainboard 593 as input to the information handling system executing one or more software or firmware applications.

The capacitive pads layer 566 may be part of the flexible PCB 584 that also includes the active shielding layer 574 and the grounding layer 576. The active shielding layer 574 may include a plurality of shielding pads 575 that are formed vertically below each of the capacitive sensor pads 578 within the active shielding layer 574 and between the capacitive sensor pads 578 and a grounding layer 576. During normal operation of the capacitive sensor pads 578, a capacitive pads microprocessor 570 in an embodiment may execute machine readable code instructions of capacitive pads driver 568 firmware to place an active shielding layer 574 of the chassis touch input sensing hardware structure 565 in a default shielding state. In such a state, each of the shielding pads 575 of the active shielding layer 574 may shield the plurality of capacitive sensors within the capacitive pads layer 566 from parasitic grounding by the nearby grounding layer 576 formed at the bottom of the flexible PCB 584. The grounding layer 576 and active shielding layer 574 may act as a controlled return path for noise and external EMI that would otherwise disrupt the operation of the plurality of capacitive sensor pads 578 of the capacitive pads layer 566. The grounding layer 576 provides EMI and grounding for the electronics of the keyboard hardware sensing structure 565 as well as shielding the capacitive sensor pads 578 from the hardware components in the information handling system hardware cavity 582 of the base chassis such as those operating on the information handling system hardware mainboard 593 and described in further detail above with reference to FIG. 1.

In an embodiment, the shielding pads 575 of the active shielding layer 574 may be active shielding pads 575. These active shielding pads 575 may be driven using the same or similar voltage as the plurality of capacitive sensor pads 578 within the capacitive pads layer 566 and may also, each, be operatively coupled to the capacitive sensor driver 568 and a power source such as located in the information handling system hardware cavity 582. This reduces parasitic capacitance between the plurality of capacitive sensor pads 578 of the capacitive pads layer 566 and the grounding layer 576 placed below the active shielding layer 574 such that the capacitive field of the capacitive sensor pads 578 is not as readily grounded reducing range and sensitivity. These active shielding pads 575 of the active shielding layer 574 improve signal-to-noise ratio and extend the sensing range of the plurality of capacitive sensors of the capacitive pads layer 566. Indeed, in an embodiment, the active shielding pads 575 allow a user to provide input such as gesture input which may have a low level of change in detected capacitance even when the user is not in physical contact with any of the keyboard keys of the removable tactile input layer 562 above the capacitive sensor pads 578 of the capacitive pads layer 566. This is because the capacitive sense capabilities of the capacitive sensor pads 578 is extended a distance above the surface of the removable tactile input layer 562 due to the inclusion of the shielding pads 575 of the active shielding layer 574.

As described, the grounding layer 576 may be formed directly below the active shielding layer 574 and forms a bottom-most layer of the flexible PCB 584 of the sealed input surface. In an embodiment, the grounding layer 576 may be provide a stable electrical reference from the active circuitry that helps to define signal baseline at the plurality of capacitive sensor pads 578 as well as provide EMI shielding for information handling system components in the base chassis.

It is appreciated that the flexible PCB 584 may form an upper portion of the base chassis of the information handling system just under the sealed input surface 561 that may form a top surface for the housing of the base chassis of the information handling system. However, the base chassis portion of the information handling system also includes the information handling system hardware cavity 582. The information handling system hardware cavity 582 may be present to provide space that other hardware component devices such as the hardware processor (e.g., FIG. 1, 102), memory devices, PMU, radiofrequency adapters, or wired ports to name a few of those hardware component devices that may be formed into the information handling system hardware cavity 582. As shown in FIG. 5, for example, the information handling system hardware cavity 582 may house an information handling system hardware mainboard 593 which may include a PCB that houses the hardware processor, other processing devices (e.g., FIG. 1, 102, 104, 106, 108, 110), the PMU, the wireless interface adapter, the radio, the RF front end, and the antenna among other hardware components.

Figure 6:
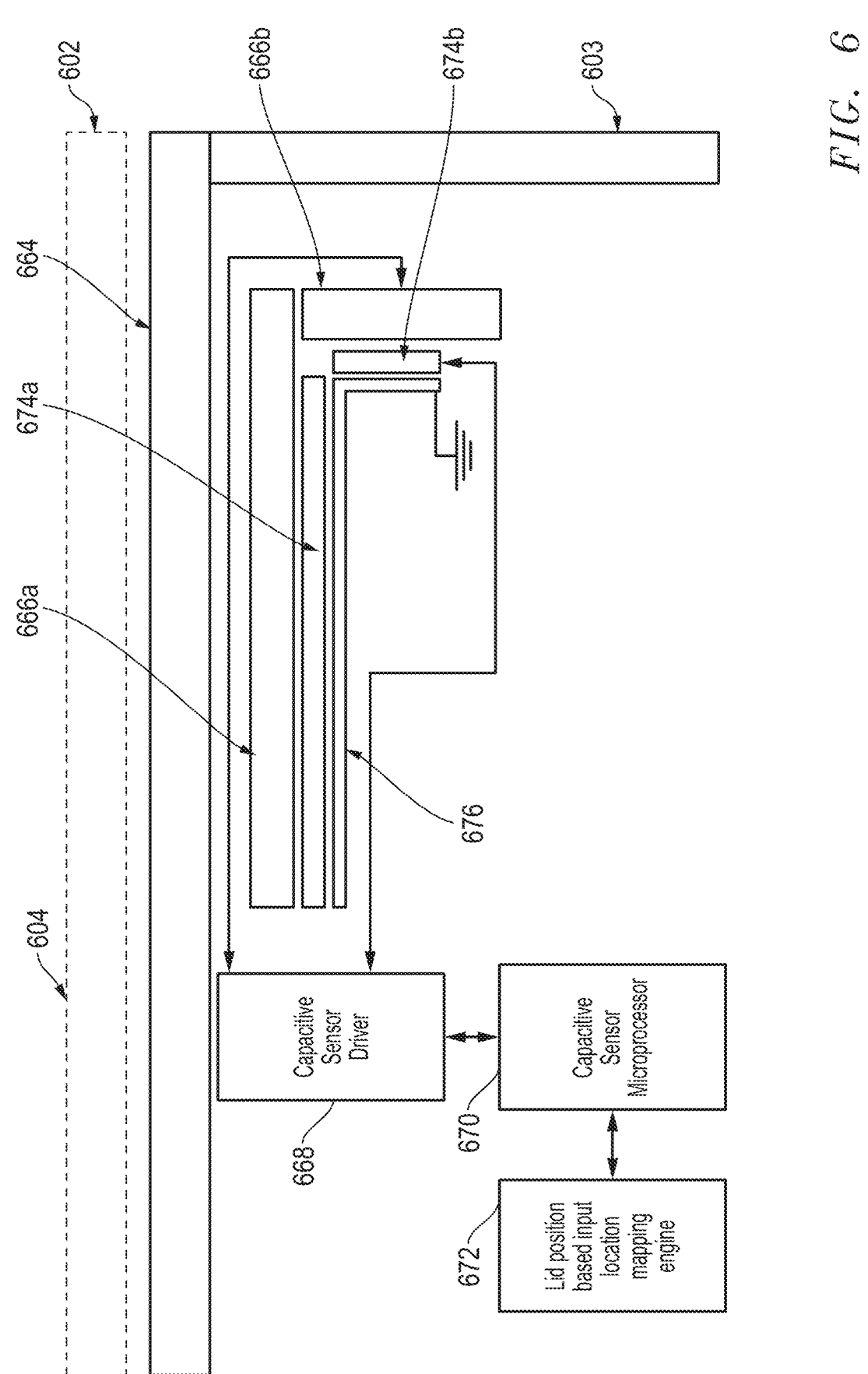
FIG. 6 is a graphic diagram illustrating a capacitive sensor microprocessor executing machine readable code instructions of a lid position based input location mapping engine for activating or deactivating capacitive sensor pads at either a base chassis exterior touch input top surface or a base chassis sidewall touch input surface based on a configurational position of a clamshell information handling system chassis according to an embodiment of the present disclosure.

FIG. 6 is a graphic diagram illustrating both top surface capacitive touch sensing hardware structure and sidewall capacitive touch sensing hardware structure for a base chassis with a capacitive sensor microprocessor executing machine readable code instructions of a lid position based input location mapping engine for activating or deactivating capacitive sensor pads based on a configurational position (e.g., open or closed) of a clamshell chassis housing an information handling system according to embodiments of the present disclosure. The configurational position (e.g., open or close) is determined by an inertial measurement unit or hall sensor according to an embodiment of the present disclosure. As described herein, the touch input sensing hardware structure and chassis touch input sensing hardware structure of embodiments of the present disclosure allow for sensing of user touch input at various locations of the base chassis and display chassis both when the clamshell chassis is in an open position and in a closed position. This presents a need to control which user touch inputs may be detected when the chassis is in a closed position and when the chassis is in an open position.

For example, it may be desirable to only allow for user touch input at the base chassis exterior touch input top surface 664 to control display brightness when the clamshell chassis is in an open configuration (e.g., as shown in FIG. 3A above), with the digital display powered on. As another example, it may be desirable to only allow for user touch input at the base chassis sidewall touch input surface 603 when the clamshell chassis is in a closed position (e.g., as shown in FIGS. 3B and 3C), to avoid inadvertent activation, deactivation, or modification of IO devices via user touch input at the base chassis sidewall touch input surface 603 when the user is handling the clamshell chassis in a closed position during transit.

Embodiments of the present disclosure address these issues by executing machine readable code instructions of a lid position based input location mapping engine 672, via a capacitive sensor microprocessor 670, to activate or deactivate capacitive sensor pads of a top capacitive pads layer 666a or a side capacitive pads layer 666b to sense touch and gesture at either the base chassis exterior touch input top surface 664, the base chassis sidewall touch input surface 603, or the display lid chassis touch input surface 604 of the display chassis 602. Activation or deactivation of capacitive sensor pads for the top capacitive pads layer 666a or the side capacitive pads layer 666b will depend on a configurational position (e.g., open or closed) of the clamshell chassis, as determined by an inertial measurement unit or hall sensor, and other inputs, for example, a strain gauge sensor detection under the display lid chassis touch input surface 604 in various embodiments.

Activation and deactivation of capacitive sensor pads in various embodiments described herein may be accomplished by instructing that capacitive sensing fields of capacitive sensor pads be affected by capacitive grounding or actual grounding of such capacitive sensor pads. This may occur via executing instructions of the capacitive sensor driver 668 firmware to place the shield 674a or 674b in one of three states in addition to the default shielding state described herein. In a first state, the capacitive sensor microprocessor 670 in an example embodiment may execute machine readable code instructions of the capacitive sensor driver 668 to place the top active shielding layer 674a or the side active shielding layer 674 in a grounding state to operate as a grounding element by minimizing voltage supplied to the active shields of the top active shielding layer 674a or the side active shielding layer 674b, respectively, disposed between those capacitive sensor pads and a ground layer 676, grounding the active shields 674a or 674b to capacitively ground the capacitive sensor pads in the capacitive pads layers 666a or 666b. In a second direct grounding state in an example embodiment the capacitive sensor microprocessor 670 may execute machine readable code instructions of the capacitive sensor driver 668 to directly ground the capacitive sensor pads in the capacitive pads layers 666a or 666b. In a third state in an example embodiment, the capacitive sensor microprocessor 670 may execute machine readable code instructions of the capacitive sensor driver 668 to place the top active shielding layer 674a or side active shielding layer 674b in a high impedance state to maximize impedance at the top active shielding layer 674a or the side active shielding layer 674b, minimizing voltage at the top active shielding layer 674a or the side active shielding layer 674b and allowing the ground below to degrade or deactivate the corresponding sensing range of the capacitive pads in the capacitive pads layers 666a or 666b. In any one of these cases, the lid position based input location mapping engine 672 in embodiments of the present disclosure may disable capacitive sensor pads sensing touch input at the base chassis sidewall touch input surface 603 when the clamshell chassis is set to an open position, and disable capacitive sensor pads sensing touch input at the base chassis exterior touch input top surface 664 when in a closed position. Further, the lid position based input location mapping engine 672 and capacitive sensor driver 668 executed by the capacitive sensor microprocessor 670 may map touch input detected at a specified location of the base chassis exterior touch input top surface 664 or base chassis sidewall 603 situated nearest an IO device to a user input IO command for that IO device. This may allow for more intuitive control of IO devices via touch input.

In an embodiment in which the clamshell chassis is placed in an open position, a capacitive sensor microprocessor 670 may execute machine readable code instructions of capacitive sensor driver 668 firmware to ground a side active shielding pad to capacitively ground and disable a side capacitive sensor pad of a base chassis side capacitive pads layer 666b. More specifically, a capacitive sensor microcontroller 670 may execute machine readable code instructions of the capacitive sensor driver 668 firmware to increase impedance beyond a threshold low voltage impedance level at a side shielding pad of a base chassis side active shielding layer 674*b* to decrease voltage supplied to the side active shielding layer 674*b*. This may cause the side active shielding layer 674*b* to cease acting as a shield, exposing the side capacitive pads layer 666*b* to the grounding layer 676, and causing the side capacitive pads layer 666*b* to capacitively ground and cease or substantially reduce sensing touch input. In another example embodiment, the capacitive sensor microcontroller 670 may execute machine readable code instructions of capacitive sensor driver 668 firmware to directly connect the grounding layer 676 to the side active shielding layer 674*b*, grounding the side shielding pad of a base chassis side active shielding layer 674*b*. This may also cause the side active shielding layer 674*b* to cease acting as a shield, exposing the side capacitive pads layer 666*b* to the grounding layer 676, and causing the side capacitive pads layer 666*b* to capacitively ground and cease sensing touch input. In yet another example embodiment, the capacitive sensor microcontroller 670 may execute machine readable code instructions of capacitive sensor driver 668 firmware to directly connect the grounding layer 676 to the side capacitive pads layer 666*b*, causing the side capacitive pads layer 666*b* to ground and cease sensing touch input.

When the clamshell chassis is in the open position, it may be desirable to increase sensitivity of the top capacitive pads layer 666*a* in order to sense both touch input and gesture input a short distance above the base chassis exterior touch input top surface 664. The capacitive sensor microprocessor 670 in such an embodiment may execute machine readable code instructions of the capacitive sensor driver 668 firmware to match voltages at a top shielding pad of a base chassis top active shielding layer 674*a* and a top capacitive sensor pad of a base chassis top capacitive pads layer 666*a* to extend the sensing range of the top capacitive sensor pad to sense touch input above the base chassis exterior touch input top surface 664 or even at the display lid chassis touch input surface 604 of the display chassis 602 when the chassis is in a closed position.

In an embodiment in which the clamshell chassis is placed in a closed position, the capacitive sensor microprocessor 670 may execute machine readable code instructions of capacitive sensor driver 668 firmware to ground a top active shielding pad to capacitively ground and disable a top capacitive sensor pad of a base chassis top capacitive pads layer 666*a*. More specifically, a capacitive sensor microcontroller 670 may execute machine readable code instructions of the capacitive sensor driver 668 firmware to increase impedance beyond a threshold low voltage impedance level at a top shielding pad of a base chassis top active shielding layer 674*a* to decrease voltage supplied to the top active shielding layer 674*a*. This may cause the top active shielding layer 674*a* to cease acting as a shield, exposing the top capacitive pads layer 666*a* to the grounding layer 676, and causing the top capacitive pads layer 666*a* to capacitively ground and cease sensing touch input. In another example embodiment, the capacitive sensor microcontroller 670 may execute machine readable code instructions of capacitive sensor driver 668 firmware to directly connect the grounding layer 676 to the top active shielding layer 674*a*, capacitively grounding the top shielding pad of a base chassis top active shielding layer 674*a*. This may also cause the top active shielding layer 674*a* to cease acting as a shield, exposing the top capacitive pads layer 666*a* to the grounding layer 676, and causing the top capacitive pads layer 666*a* to capacitively ground and cease or substantially reduce sensing touch input. In yet another example embodiment, the capacitive sensor microcontroller 670 may execute machine readable code instructions of capacitive sensor driver 668 firmware to directly connect the grounding layer 676 to the top capacitive pads layer 666*a*, causing the top capacitive pads layer 666*a* to ground and cease sensing touch input.

When the clamshell chassis is in the closed position, it may be desirable to increase sensitivity of the side capacitive pads layer 666*b* in order to sense both touch input and gesture input a short distance to the side of the base chassis sidewall 603. The capacitive sensor microprocessor 670 in such an embodiment may execute machine readable code instructions of the capacitive sensor driver 668 firmware to match voltages at a side shielding pad of a base chassis side active shielding layer 674*b* and a side capacitive sensor pad of a base chassis side capacitive pads layer 666*b* to extend the sensing range of the side capacitive sensor pad to sense touch input beside and not in contact with the base chassis sidewall 603.

Figure 7:
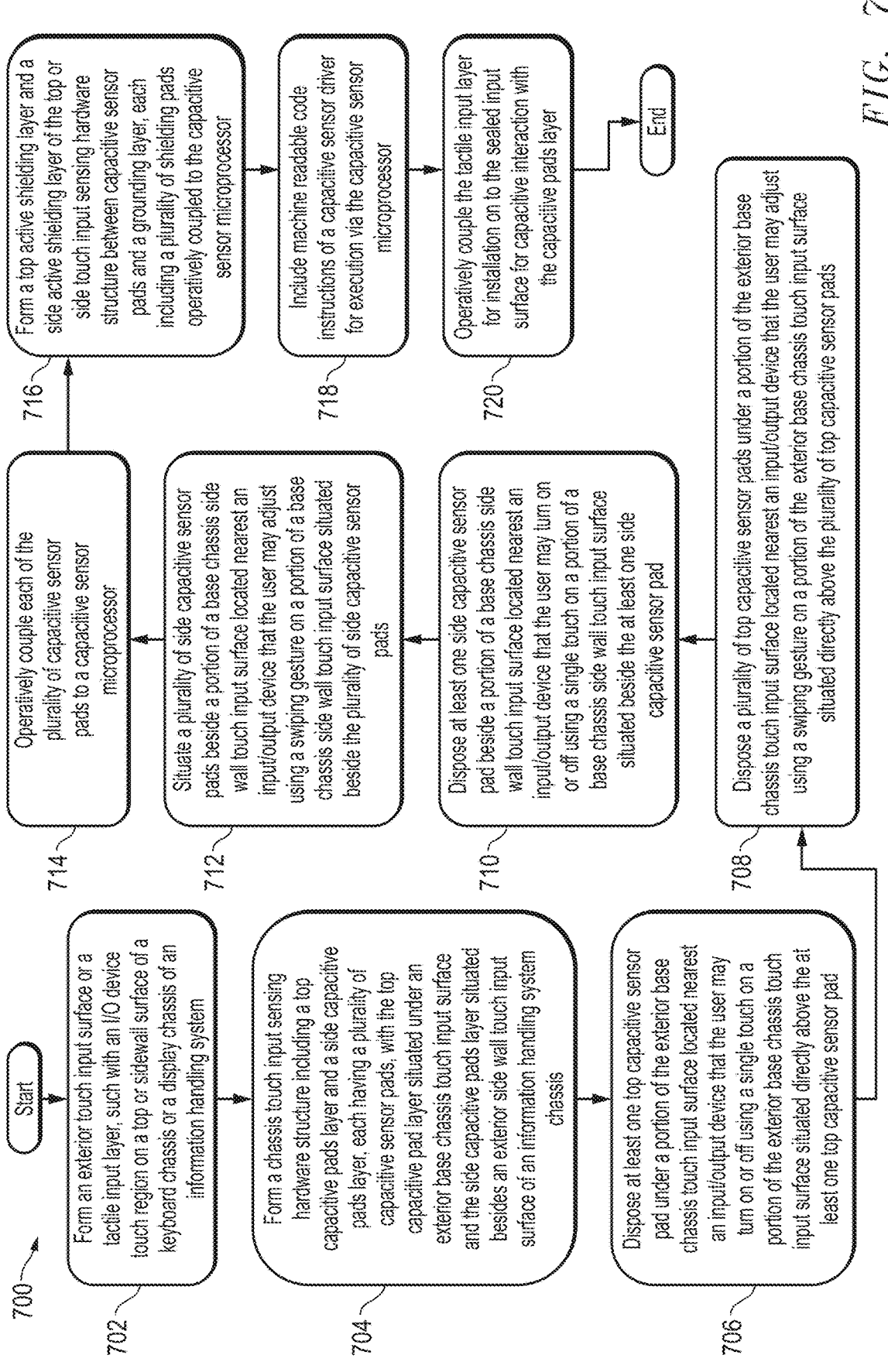
FIG. 7 is a flow diagram showing a method of manufacturing a touch input sensing hardware structure stack that includes capacitive sensor pads to receive user input at chassis touch input surfaces to be capacitively detected at the capacitive sensor pads sealed within an information handling system chassis according to an embodiment of the present disclosure.

FIG. 7 is a flow diagram showing a method 700 of manufacturing a touch input sensing hardware structure stack that includes capacitive sensor pads formed under a base chassis touch input surface on a top or sidewall surface of the base chassis to receive user input capacitively detected at the capacitive sensor pads sealed within the information handling system chassis according to an embodiment of the present disclosure. The method may also include similar manufacturing processes to form a touch input stack structure of hardware layers as described in connection with embodiments above that each include a bifurcated or touch input stack between exterior base chassis touch input surfaces and chassis touch input sensing hardware structure formed within the base chassis. The method of manufacture for the touch input stack of structure layers comprises the chassis touch input sensing hardware structure with a capacitive pads layer, an active shielding layer, and a grounding layer formed under a chassis touch input surface that may be formed at one or more top or sidewall locations on an exterior surface of the base chassis of the information handling system in various embodiments.

At block 702, the method 700 includes forming an exterior base chassis exterior touch input top surface or a tactile input layer, which may include an IO device touch region on a top or sidewall exterior surface of a keyboard or base chassis or on a display chassis of an information handling system in an embodiment. As described herein, an information handling system may be housed in a clamshell type chassis, such as a laptop computer, having a base chassis, also referred to as a keyboard chassis, that houses information handling system hardware components and IO devices. The base chassis, as described further below, also seals in and houses a touch input sensing hardware structure that senses capacitive changes in capacitive sensor pads of a capacitive pads layer disposed beneath the top or sidewall surface of the base chassis as a user interacts with touch input surface regions through touch inputs or by hovering a finger or portion of a hand just above that surface for touchless gesture inputs.

In embodiments herein, such as that shown in FIG. 4, this top or sidewall exterior surface of the base chassis through which the capacitive sensor pads 478 of the capacitive pads layer 466 may sense such user touch input may include a base chassis exterior touch input top or sidewall surface 480. Thus, the process includes creating plural touch input regions by forming an icon or designation printed or etched on the exterior surface of the clamshell chassis, such as on the base chassis or the display lid chassis, to form the touch input regions at the surface location of the icon. These plural touch input regions may be formed at locations on the top surface or sidewall surface of the base chassis or on the outer surface of the display lid chassis and correspond to IO devices within the base chassis or to control IO devices or for computing device functional controls for touch inputs or touchless gesture inputs in embodiments herein. In other embodiments, the process includes forming touch input regions at known locations for IO devices, which may be visible such as a speaker grill location, on the base chassis or the display lid chassis to form the touch input regions at the surface location that is known or apparent for IO devices within the base chassis to provide for computing device functional controls in some embodiments herein.

For example, as shown in FIG. 3A, base chassis exterior touch input top surface 364 may be formed with plural These may surround a mechanical keyboard 352 or a trackpad area, or may include some or all of the trackpad. FIG. 3A shows plural touch input regions formed as base chassis exterior touch input top surfaces for receiving touch inputs or touchless gesture inputs. For example, plural touch input regions may include those depicted at 381, 382a, 383a, 384a, 385a, 386, or 387a and may include icons etched or printed on the outer surface of the base chassis 301 as shown in FIG. 3A. These plural touch inputs regions 381, 382a, 383a, 384a, 385a, 386, or 387a may be designated for various IO devices within base chassis 301 including speaker, trackpad auxiliary inputs, microphone, wireless radio, display device or the like that may be installed within the base chassis 301 or in the display chassis 302 in embodiments herein.

FIG. 3B shows plural touch input regions formed as base chassis touch input sidewall surfaces for receiving touch inputs or touchless gesture inputs. For example, plural touch input regions may include those depicted at 303a, 303b, 303c, 381, 384b, 385b, or 387b and may include icons etched or printed on the outer surface of the base chassis 301 as shown in FIG. 3B. These plural touch inputs regions 303a, 303b, 303c, 381, 384b, 385b, or 387b may be designated for various IO devices within base chassis 301 including speaker, trackpad auxiliary inputs, microphone, wireless radio or the like that may be installed within the base chassis 301 or in the display chassis 302 in embodiments herein.

In other embodiments, such as described with reference to FIG. 5, this top surface may be formed as a sealed input surface 561 upon which a removable tactile input layer 562 such as an interchangeable keyboard may be disposed, as described herein, and used to sense user touch inputs to a display lid chassis touch input surface in a closed position of the clamshell information handling system chassis. The removable tactile input layer or the base chassis exterior touch input top surface may be that layer that a user interacts with to provide input to the information handling system such as keyboard keypress input, touch input on keyboard keys or on a touch surface, or gesture input detected above the removable tactile input layer in various embodiments herein.

At block 704, the method 700 further includes forming a touch input sensing hardware structure including a top capacitive pads layer and a side capacitive pads layer, each having a plurality of capacitive sensor pads, with the top capacitive pads layer situated under an exterior touch input surface and the side capacitive pads layer situated beside and internal to an exterior sidewall of an information handling system chassis. The touch input sensing hardware structure is formed under, as part of or adhered to, the base chassis exterior touch input top surface of the base chassis of an information handling system, and beside and interior to a base chassis sidewall in various embodiments. The top capacitive pads layer and side capacitive pads layer may include a plurality of capacitive sensors that can sense changes in capacitance from user interaction within their capacitive sensing fields to detect user input on or above the base chassis exterior touch input top surface or base chassis sidewall touch input surface of the base chassis. These capacitive sensor pads are arranged at locations under the base chassis exterior touch input top surface or internal to the base chassis sidewall touch input surface to detect varying levels of capacitive changes caused by a user's fingers in those capacitive sensing fields at locations across the base chassis exterior touch input top surface or base chassis sidewall touch input surface for touch inputs or touchless gesture inputs. Further, these capacitive sensor pads are arranged to correspond to a nearest input/output (IO) device to detect a capacitive change associated with an IO command to adjust functionality of that IO device.

In an embodiment, the plurality of capacitive sensor pads may be formed of deposited patches of deposited carbon on a non-conductive substrate and configured to detect variation in an electric capacitive field in response to changes in nearby capacitance above the base chassis exterior touch input top surface or base chassis sidewall touch input surface at the location of the capacitive sensor pad. These carbon-based patches may be arranged in a sensor matrix and may be printed, spattered, or otherwise deposited on a non-conductive substrate such as an ABS polymer surface, a flexible PCB, or other PCB. The ABS polymer surface may be the underside of the base chassis exterior touch input top surface or the interior of a base chassis sidewall of the information handling system in an embodiment. In an embodiment, the array of deposited carbon patches may be arranged such that a touch input region of the chassis surface at each IO device or at an icon etched or printed thereon representing each IO device located on the base chassis exterior touch input top surface or base chassis sidewall aligns vertically or horizontally with one or more deposited carbon patches.

In other embodiments, the chassis touch input sensing hardware structure is formed under, as part of or adhered to, the sealed input surface of the chassis of an information handling system in various embodiments. The capacitive pads layer may include a plurality of capacitive sensors that can sense changes in capacitance from user interaction on or above the removable tactile input layer proximate and above the sealed input surface of the chassis. These capacitive sensor pads are arranged at locations under the sealed input surface of the chassis to detect varying levels of capacitive changes caused by a user's fingers at locations across the sealed input surface for touch or gesture inputs. Further, these capacitive sensor pads are arranged to correspond under one or more keyboard keys of a removable tactile input layer keyboard structure or under a base chassis exterior surface touch input region nearest to an input/output (IO) device to detect a capacitive change associated with a keypress actuation of one or more keyboard keys or an IO command to adjust functionality of the nearest IO device.

In an embodiment, the plurality of capacitive sensor pads may include patches of deposited carbon configured to vary an electric field in response to changes in nearby capacitance above the sealed input surface of the chasses at the location of the capacitive sensor pad. These carbon-based patches may be arranged in a sensor matrix and may be printed, spattered, or otherwise deposited on a non-conductive substrate such as an ABS polymer surface, a flexible PCB, or other PCB. The ABS polymer surface may be the underside of the sealed input surface of the chassis of the information handling system in an embodiment. In an embodiment, the array of deposited carbon patches may be arranged such that each key of the removable tactile input layer aligns vertically with one or more deposited carbon patch.

At block 706, at least one top capacitive sensor pad in an embodiment may be situated under a portion of the base chassis exterior touch input top surface located nearest an input/output (IO) device that the user may turn on or off using a single touch on a portion of the base chassis exterior touch input top surface at a touch input region situated directly above the at least one top capacitive sensor pad. For example, in an embodiment described with respect to FIG. 3A, placement of a capacitive sensor pad within microphone touch input regions 383*a* and 384 and nearby a microphone for sensing a user tapping or pressing the base chassis exterior touch input top surface 364 situated nearest the known location of the microphone may provide a location for sensing user tapping or pressing to mute or unmute the microphone or a swiping touch input to adjust volume of the microphone that is more intuitive to a user than a button or hotkey of a keyboard 352 currently used to control such a microphone. This may also save space otherwise reserved for buttons or hotkeys in or around the keyboard 352 that are dedicated to adjusting control of the microphone or other IO devices, such as the touchpad, speaker, display device, or wireless antenna, for example. In another example, placement of a capacitive sensor pad within the antenna touch input regions 385*a* and nearby an antenna for sensing a user tapping or pressing the base chassis exterior touch input top surface 364 situated nearest the known location of the antenna may provide a location for sensing user tapping or pressing to activate or deactivate the antenna that is more intuitive to a user than a button or hotkey of a keyboard 352 currently used to control such an antenna. In yet another example, placement of a capacitive sensor pad within the trackpad touch input regions 382*a* or 387*a* and nearby a trackpad for sensing a user tapping or pressing the base chassis exterior touch input top surface 364 situated nearest the known location of the trackpad may provide a location for sensing user tapping or pressing to click within the trackpad. Accordingly, a chassis touch input sensing hardware structure with at least one capacitive sensor pad may be placed under each of the touch input regions of the base chassis exterior touch input top surface for the base chassis to receive single touch inputs at those touch input regions on the exterior top surface of the base chassis such as for on/off, mute/unmute, pause/unpause or other computer device function input controls in embodiments herein.

A plurality of top capacitive sensor pads in an embodiment at block 708 may be situated under a portion of the exterior touch input surface located nearest an input/output device that the user may adjust using a swiping touch or gesture on a portion of the exterior touch input surface situated directly above the plurality of top capacitive sensor pads as another type of touch input region. For example, in an embodiment described with respect to FIG. 3A, a plurality of top capacitive sensor pads may be situated under a portion of the base chassis exterior touch input top surface 364 located nearest an input/output device that the user may adjust using a swiping gesture on a portion of the base chassis exterior touch input top surface 364 situated above the plurality of top capacitive sensor pads. For example, placement of a plurality of capacitive sensor pads within speaker touch input region 381 and nearby a speaker for sensing a user swiping across the base chassis exterior touch input top surface 364 situated nearest the known location of the speaker may provide a location for sensing user swiping across the plurality of top capacitive sensor pads to change the volume for the speaker, that is more intuitive to a user than a button or hotkey of a keyboard 352 currently used to control such a speaker. As another example, placement of a plurality of capacitive sensor pads within display touch input region 386 and nearby a digital display housed in display chassis 302 for sensing a user swiping across the base chassis exterior touch input top surface 364 situated nearest the known location of the display may provide a location for sensing user swiping across the plurality of top capacitive sensor pads to change the brightness of the display 386, that is more intuitive to a user than a button or hotkey of a keyboard 352 currently used to control such a display. As yet another example, placement of a plurality of capacitive sensor pads within trackpad touch input regions 382*a* and 387*a* and nearby a trackpad for sensing a user swiping across the base chassis exterior touch input top surface 364 or the base chassis sidewall situated nearest the known location of the trackpad may provide a location for sensing user swiping across the plurality of top capacitive sensor pads to move a cursor. Accordingly, a chassis touch input sensing hardware structure with plurality of capacitive sensor pads may be placed under each of the touch input regions of the base chassis exterior touch input top surface for the base chassis to receive movement of touch inputs or touchless gesture inputs at those touch input regions on the exterior top surface of the base chassis such as for level settings, volume or brightness controls, or gauged inputs or adjustments to computer software, firmware, or IO device functions, or other computer device function input controls in embodiments herein.

At block 710, at least one side capacitive sensor pad in an embodiments may be situated beside a portion of a base chassis sidewall touch input surface located nearest an input/output device that the user may turn on or off using a single touch on a portion of a base chassis sidewall situated beside the at least one side capacitive sensor pad formed as another type of touch input region. For example, in an embodiment described with respect to FIG. 3B, placement of a capacitive sensor pad within microphone touch input region 383*b* on base chassis sidewall touch input surface 303*c* and nearby a microphone for sensing a user tapping or pressing the base chassis sidewall touch input surface 303*c* situated nearest the known location of the microphone may provide a location for sensing user tapping or pressing to mute or unmute the microphone or a swiping touch input to adjust volume of the microphone that is more intuitive to a user than a button or hotkey of a keyboard currently used to control such a microphone. In another example, placement of a capacitive sensor pad within the antenna touch input regions 385*b* on base chassis sidewall touch input surface 303*b* and nearby an antenna for sensing a user tapping or pressing the base chassis sidewall touch input surface 303*b* situated nearest the known location of the antenna may provide a location for sensing user tapping or pressing to activate or deactivate the antenna that is more intuitive to a user than a button or hotkey of a keyboard currently used to control such an antenna. In yet another example, placement of a capacitive sensor pad within the trackpad touch input region 387*b* on base chassis sidewall touch input surface 303*a* and nearby a trackpad for sensing a user tapping or pressing the base chassis sidewall touch input surface 303*a* situated nearest the known location of the trackpad may provide a location for sensing user tapping or pressing to click within the trackpad. Accordingly, a chassis touch input sensing hardware structure with at least one capacitive sensor pad may be placed internal to each of the touch input regions of the base chassis sidewall touch input surface for the base chassis to receive single touch inputs at those touch input regions on the exterior sidewall surface of the base chassis such as for on/off, mute/unmute, pause/unpause or other computer device function input controls in embodiments herein.

In an embodiment at block 712, a plurality of side capacitive sensor pads may be situated beside and internal a portion of a base chassis sidewall touch input surface located nearest an input/output device that the user may adjust using a swiping gesture on a portion of a base chassis sidewall situated beside the plurality of side capacitive sensor pads formed as yet another type of touch input region. For example, a plurality of side capacitive sensor pads may be situated beside a portion of a base chassis sidewall touch input surface 303*a*, 303*b*, or 303*c* located nearest an input/output device that the user may adjust using a swiping gesture on a portion of a base chassis sidewall touch input surface situated beside the plurality of side capacitive sensor pads. More specifically, placement of a plurality of capacitive sensor pads within speaker touch input region 381 and nearby a speaker for sensing a user swiping across the base chassis sidewall touch input surface 303*c* situated nearest the known location of the speaker may provide a location for sensing user swiping across the plurality of side capacitive sensor pads to change the volume for the speaker, that is more intuitive to a user than a button or hotkey of a keyboard currently used to control such a speaker. As another example, placement of a plurality of capacitive sensor pads within trackpad touch input region 387*b* on base chassis sidewall touch input surface 303*a* and nearby a trackpad for sensing a user swiping across the base chassis sidewall touch input surface 303*a* situated nearest the known location of the trackpad may provide a location for sensing user swiping across the plurality of side capacitive sensor pads to move a cursor. Accordingly, a chassis touch input sensing hardware structure with plurality of capacitive sensor pads may be placed internal to each of the touch input regions of the base chassis sidewall touch input surface for the base chassis to receive movement of touch inputs or touchless gesture inputs at those touch input regions on the exterior sidewall surface of the base chassis such as for level settings, volume or brightness controls, or gauged inputs or adjustments to computer software, firmware, or IO device functions, or other computer device function input controls in embodiments herein.

At block 714, each of the capacitive sensor pads that form the plurality of capacitive sensors within the capacitive pads layer may be operatively coupled to a capacitive sensor microcontroller executing a capacitive sensor driver housed within the information handling system. The capacitive sensor pads may be operatively coupled to the capacitive sensor microcontroller via conductive traces formed on an under surface of the chassis touch input surface, such as an ABS polymer sealed input chassis surface in one embodiment, or on or in a surface of a non-conductive chassis touch input sensing hardware structure substrate such as a PCB or a flexible PCB, or some combination in embodiments described herein. The capacitive sensor microcontroller may be formed on a separate PCB or a flexible PCB that may be electrically coupled to the non-conductive chassis touch input sensing hardware structure substrate in embodiments herein. The capacitive sensor microcontroller executes machine readable code instructions of a capacitive sensor driver and may be operatively coupled to a hardware processor of the information handling system for provision of user IO inputs such as keypress inputs, touch inputs, or touchless gesture inputs to the hardware processor executing machine readable code instructions of one or more software or firmware applications. It is also appreciated that carbon traces or other types of conductive traces may be formed to operatively couple the carbon pads to the capacitive sensor driver such as copper traces, silver traces, or indium tin oxide (ITO) that allow each of the carbon pads to conduct change in capacitance change signals to the capacitive sensor microcontroller. The capacitive sensor microcontroller may execute machine readable code instructions for the capacitive sensor driver to determine the functional computing device control input indicative of the user's keypress input, user's touch, or a touchless gesture at or near a touch input region of the chassis touch input surfaces. In other embodiments, capacitive sensor microcontroller may execute machine readable code instructions for the capacitive sensor driver to determine keypresses, touch input, or touchless gesture inputs near the keys or other input surfaces of the removable tactile input layer portion of a split keyboard structure above the sealed input surface of the chassis of the information handling system.

The method 700 further includes forming an active shielding layer that includes a plurality of shielding pads at block 716 as part of the chassis touch input sensing hardware structure that is formed under, as part of or adhered to, the chassis touch input surface of the chassis of an information handling system. In an embodiment, the touch input sensing hardware structure may also include an active shielding layer which may be operatively coupled to a capacitive sensor microprocessor and PMU to be supplied a voltage level to shield the plurality of capacitive sensor pads from parasitic capacitive grounding to a grounding source such as a grounding layer of the touch input sensing hardware structure. During normal operation of the capacitive sensor pads, a capacitive pads microprocessor in an embodiment may execute machine readable code instructions of capacitive pads driver firmware to place an active shielding layer of the chassis touch input sensing hardware structure in a default shielding state. In such a state, the active shielding pads may reduce parasitic capacitance grounding between the capacitive sensor pads and a grounding layer placed below the active shielding layer by requiring the capacitive fields of the capacitive sensor pads to go around the active shielding pads to reach the grounding layer. Thus, these active shielding pads of the active shielding layer improve signal-to-noise ratio and extend the sensing range of the plurality of capacitive sensor pads on the capacitive pads layer such as for detecting lower capacitive change levels, for example, that may be associated with gesture inputs hovering above the base chassis exterior touch input top surface, or touch inputs at the base chassis sidewall touch input surface or even an exterior surface of the display lid chassis when the clamshell chassis is placed in a closed configuration. Indeed, in an embodiment, the active shielding pads allow a user to provide input, such as gesture input, even when the user is not in physical contact with any surfaces of the base chassis or allows detection of user input at or above the display lid chassis, which may be detected as a capacitive change from the capacitive sensor pads. This is because the capacitive sense capabilities of the capacitive sensor pads is extended a distance above the outer chassis surfaces due to the inclusion of the shielding pads of the active shielding layer limiting the parasitic capacitive grounding of the capacitive fields of the capacitive sensor pads. The active shielding layer may include a plurality of shielding pads that are formed vertically below or internal to each of the capacitive sensor pads within the active shielding layer and between the capacitive pads layer and a grounding layer, such as on a PCB or on a flexible PCB.

In an embodiment, the shielding pads of the active shielding layer are active shielding pads operatively coupled to the capacitive sensor microprocessor and a power source, such as via a PMU. These active shielding pads may be driven by the capacitive sensor microprocessor using the same voltage as the plurality of capacitive sensor pads within the capacitive pads layer thereby shielding or avoiding parasitic capacitive grounding of the capacitive sensing pads by the nearby ground layer during operation. Thus, the active shielding pads are each operatively coupled to the capacitive sensor microprocessor and a power source, such as a PMU, via conductive traces in the chassis touch input sensing hardware structure formed under or internal to the chassis touch input surface of the chassis of an information handling system when installed. In this way, the active shielding pads reduce parasitic capacitance between the corresponding plurality of capacitive sensor pads of the capacitive pads layer and the grounding layer placed below the active shielding layer. The grounding layer is formed for EMI shielding of internal information handling system hardware components with the base chassis as well as to provide a grounding source for the capacitive sensor pads of the chassis touch input sensing hardware structure in embodiments herein.

At block 718, the method 700 includes providing firmware machine readable code instructions of a capacitive sensor driver to the capacitive sensor microcontroller in an embodiment that may receive capacitive difference level changes from the operatively coupled network of the plurality of capacitive sensor pads situated beneath or internal to the IO device touch input regions to determine the input as a touch input on an IO device, or as a touchless gesture input above a base chassis exterior touch input top surface or base chassis touch input sidewall surface. The machine readable code instructions of the capacitive sensor driver executes on the capacitive sensor microprocessor to process various types of user input via touch input regions of the base chassis exterior touch input top surfaces or the base chassis touch input sidewall surfaces.

Various types of touch input may be characterized by one or more detected capacitive change levels and characterized by location or movement across locations of capacitive sensor pads in the various touch input regions as IO input from the user for the hardware processor of the information handling system. If the detected capacitive change is at a first capacitive change level, the capacitive sensor driver may relay the sensed change from the capacitive sensor microprocessor to the hardware processor for processing of a single tap or touch as input to software or firmware applications executing on the information handling system. Similarly, a second level of capacitive change or detection across plural capacitive sensor pads of the presence of motion from the touch input or touchless gesture input of a human finger detected at one or more capacitive sensor pads may indicate a touchless gesture input above or nearby the base chassis exterior touch input top surface or a base chassis touch input sidewall surface such that the capacitive sensor microprocessor executing the capacitive sensor driver may determine a touchless gesture input of the user corresponds to an input command to the information handling system in some embodiments. In an example embodiment, the second level of capacitive change may be lower or less than the first level of capacitive change associated with a touch or tap.

In an embodiment at block 720, a split-keyboard structure of some embodiments herein may be completed by operatively coupling the removable tactile input layer on to sealed input surface, but which may be removed and replaced by another removable tactile input layer for use with the chassis touch input sensing hardware structure is formed under the sealed input surface of the chassis of an information handling system in embodiments herein. This removable tactile input layer may be installed over the sealed input surface via an interference fit system, magnetic interface structures, mechanical latch or other structure such that the removable tactile input layer is detachable and replaceable with a new or different removable tactile input layer for use with the chassis touch input sensing hardware structure formed under the sealed input surface of the chassis. The removable tactile input layer is replaceable as a mechanical-only portion of the split-keyboard structure. In some embodiments, a traditional keyboard or trackpad may be installed with the base chassis to complete the base chassis and cover the internal information handling system hardware components installed within the base chassis.

At this point the method 700 may end with the split-keyboard structure of some embodiments or a traditional keyboard structure and trackpad herein being formed in, for example, a base portion of a laptop-type information handling system. The base chassis and a top lid chassis having a display device may be operatively coupled with a hinge to the base chassis to form a laptop type information handling system in some embodiments.

Figure 8:
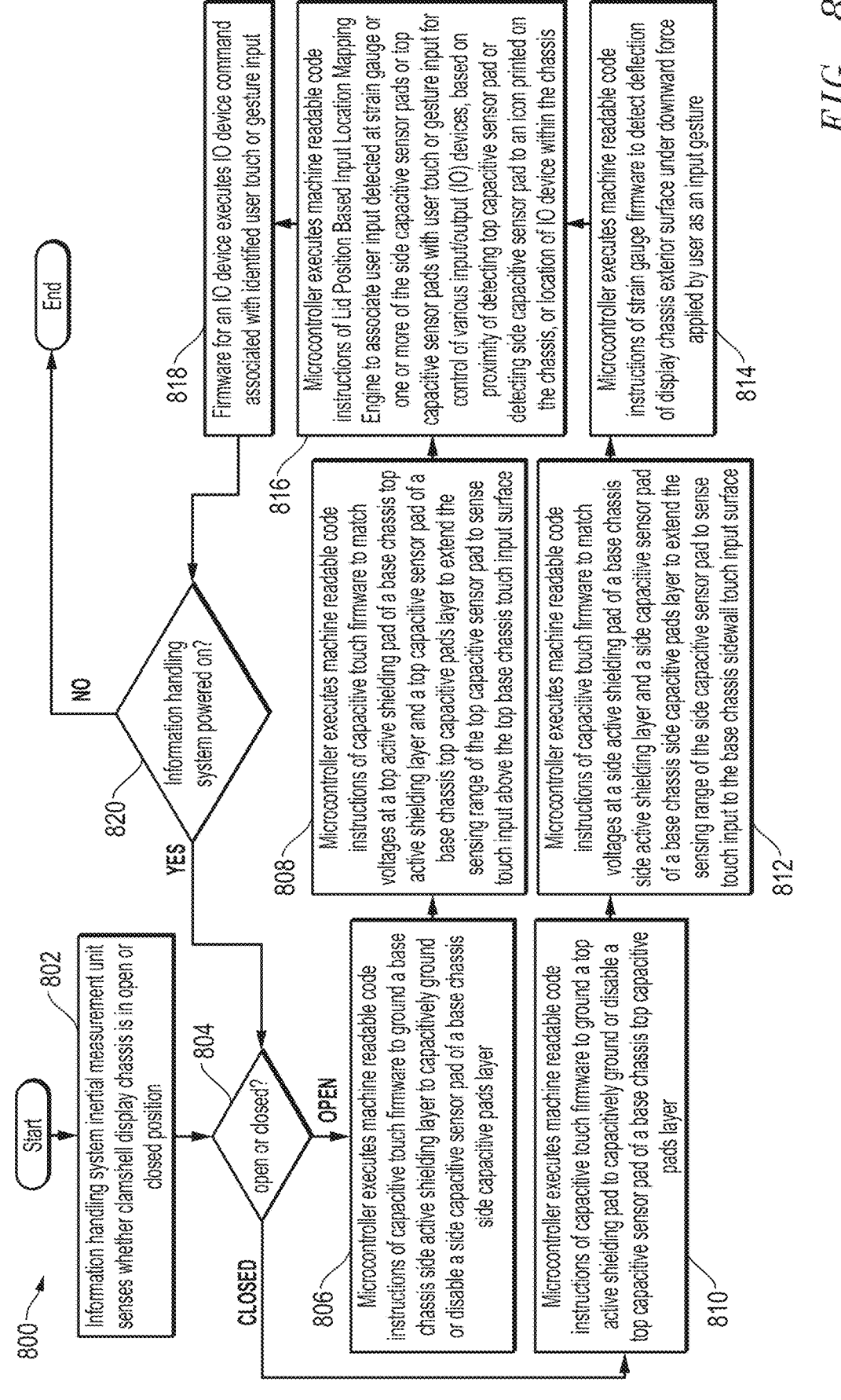
FIG. 8 is a flow diagram showing a method of activating or deactivating capacitive sensor pads sealed within a base chassis at either a base chassis exterior touch input top surface or a base chassis sidewall touch input surface based on a configurational position of a clamshell information handling system chassis according to an embodiment of the present disclosure.

FIG. 8 is a flow diagram showing a method 800 of activating or deactivating capacitive sensor pads sealed within a base chassis at either a base chassis exterior touch input top surface or a base chassis sidewall touch input surface based on a configurational position (e.g., open or closed) of a clamshell chassis housing an information handling system, as determined by an inertial measurement unit or hall sensor according to an embodiment of the present disclosure. As described herein, the chassis touch input sensing hardware structure of embodiments of the present disclosure allow for sensing of user touch input at various locations of the base chassis and display chassis both when the clamshell chassis is in an open position and in a closed position. This presents a need to control which user touch inputs may be detected when the chassis is in a closed position and when the chassis is in an open position. A capacitive sensor microprocessor may execute machine readable code instructions for a lid position based input location mapping engine to detect lid position of the display chassis lid relative to the base chassis of the information handling system, and control the operation of the top surface or sidewall chassis touch input sensing hardware structures.

For example, it may be desirable to only allow for user touch input at the base chassis exterior touch input top surface to control display brightness when the clamshell chassis is in an open configuration with the digital display powered on. As another example, it may be desirable to only allow for user touch input at the base chassis sidewall touch input surface when the clamshell chassis is in a closed position to avoid inadvertent activation, deactivation, or modification of IO devices via user touch input at the base chassis sidewall touch input surface when the user is handling the clamshell chassis in a closed position during transit.

At block 802, the method 800 includes an information handling system inertial measurement unit (IMU) sensing whether a clamshell display chassis is in an open or closed position. For example, one or more IMUs of the information handling system may sense when the display chassis is situated horizontal with a flat surface, such as would be the case in a closed position, or at an angle with respect to the horizon, which may be the case when the clamshell chassis is in an open position. Other sensors are also contemplated, such as Hall sensors, optical sensors, or the like, to detect whether the clamshell display chassis is in an open or closed position of the display chassis lid relative to the base chassis in embodiments herein.

It may be determined at block 804 whether the clamshell display chassis is currently situated in the open or closed position. If the clamshell display chassis is in the open position, the method may proceed to block 806 for disabling the side capacitive sensor pads of the touch input sensing hardware structure. If the clamshell display chassis is in the closed position, the method may proceed to block 810 for disabling the top capacitive sensor pads of the touch input sensing hardware structure.

At block 806, in an embodiment in which the clamshell chassis is placed in an open position, a capacitive sensor microprocessor may execute machine readable code instructions of capacitive sensor driver firmware to ground a base chassis side active shielding layer to capacitively ground the capacitive sensing fields of the side capacitive sensor pads to disable the side capacitive sensor pad of a base chassis side capacitive pads layer. For example, in an embodiment described with respect to FIG. 6, in which the clamshell chassis is placed in an open position, a capacitive sensor microprocessor 670 may execute machine readable code instructions of capacitive sensor driver 668 firmware to ground a side active shielding pad 674b of the sidewall chassis touch input sensing hardware structure to ground and disable a side capacitive sensor pad of a base chassis side capacitive pads layer 666b by reducing or eliminating their capacitive sensing fields with the grounding layer 676.

In one example embodiment, a capacitive sensor microcontroller 670 may execute machine readable code instructions of the capacitive sensor driver 668 firmware to increase impedance beyond a threshold low voltage impedance level to reduce voltage supplied to the side shielding pad of a base chassis side active shielding layer 674b to decrease voltage supplied to the side active shielding layer 674b and to ground the side active shielding layer 674. For example, the capacitive sensor microprocessor 670 may execute machine readable code instructions of the capacitive sensor driver 668 to place the top active shielding layer 674a or the side active shielding layer 674b in a predefined high impedance state to maximize impedance at the top active shielding layer 674a or the side active shielding layer 674b, minimizing voltage at the top active shielding layer 674a or the side active shielding layer 674b and allowing the ground below to degrade or deactivate the corresponding sensing range of the capacitive pads in the capacitive pads layers 666a or 666b. This may cause the side active shielding layer 674b to cease acting as a parasitic capacitance shield, exposing the side capacitive pads layer 666b to the grounding layer 676, and causing the capacitive sensing fields of the side capacitive pads layer 666b to capacitively ground substantially reducing or ceasing capacitively sensing touch input. In another example embodiment, the capacitive sensor microcontroller 670 may execute machine readable code instructions of capacitive sensor driver 668 firmware to directly connect, via a switch, transistor or other switching device, the grounding layer 676 to the side active shielding layer 674b, causing grounding the side shielding pad of a base chassis side active shielding layer 674b and capacitively grounding the nearby capacitive sensing fields of the side capacitive pads layer 666b. This may also cause the side active shielding layer 674b to cease acting as a parasitic capacitance shield, also exposing the side capacitive pads layer 666b to the grounding layer 676, and causing the side capacitive pads layer 666b to capacitively ground and cease capacitively sensing touch input. In yet another example embodiment, the capacitive sensor microcontroller 670 may execute machine readable code instructions of capacitive sensor driver 668 firmware to directly connect, via a switch, transistor or other switching device, the grounding layer 676 to the side capacitive pads layer 666b, causing the side capacitive pads layer 666b to ground and cease capacitively sensing touch input.

The capacitive sensor microprocessor in an embodiment at block 808 may execute machine readable code instructions of capacitive touch firmware to match voltages at a top shielding pad of a base chassis top active shielding layer and a top capacitive sensor pad of a base chassis top capacitive pads layer to extend the sensing range of the top capacitive sensor pad to sense touch input above the base chassis exterior touch input top surface at one or more touch input regions on the exterior top surface of the base chassis. For example, as shown with FIG. 6, when the clamshell chassis is in the open position, it may be desirable to increase sensitivity of the top capacitive pads layer 666a in order to sense both touch input and gesture input a short distance above the base chassis exterior touch input top surface 664. The capacitive sensor microprocessor 670 in such an embodiment may execute machine readable code instructions of the capacitive sensor driver 668 firmware to match voltages at a top shielding pad of a base chassis top active shielding layer 674a and a top capacitive sensor pad of a base chassis top capacitive pads layer 666a to extend the sensing range of the top capacitive sensor pad to sense touch input above the base chassis exterior touch input top surface 664. The method may then proceed to block 816 for associating sensed user touch input with an IO command to adjust operation of one or more IO devices.

Returning to block 810 when the clamshell chassis is placed in a closed position, the capacitive sensor microprocessor may execute machine readable code instructions of capacitive touch firmware to ground a top active shielding layer to capacitively ground the capacitive sensing field and disable a top capacitive sensor pad of a base chassis top capacitive pads layer in an embodiment. In an embodiment described with respect to FIG. 6 in which the clamshell chassis is placed in a closed position, the capacitive sensor microprocessor 670 may execute machine readable code instructions of capacitive sensor driver 668 firmware to ground a top active shielding layer 674a to capacitively ground the capacitive sensing fields and disable a top capacitive sensor pad of a base chassis top capacitive pads layer 666a. More specifically, a capacitive sensor microcontroller 670 may execute machine readable code instructions of the capacitive sensor driver 668 firmware to increase impedance beyond a threshold low voltage impedance level at a top shielding pad of a base chassis top active shielding layer 674a to decrease voltage supplied to the top active shielding layer 674a. This may cause the top active shielding layer 674a to cease acting as a parasitic capacitance shield, exposing the top capacitive pads layer 666a to the grounding layer 676, and causing the capacitive sensing fields of the top capacitive pads layer 666a to capacitively ground and cease sensing touch input. In another example embodiment, the capacitive sensor microcontroller 670 may execute machine readable code instructions of capacitive sensor driver 668 firmware to directly connect, via a switch, transistor, or other switching device, the grounding layer 676 to the top active shielding layer 674*a*, grounding the top shielding pad of a base chassis top active shielding layer 674*a* and capacitively grounding the capacitive sensing fields of the top capacitive pads layer 666*a* with the active shielding layer 674*a*. This may also cause the top active shielding layer 674*a* to cease acting as a parasitic capacitance shield, exposing the top capacitive pads layer 666*a* to the grounding layer 676, and causing the top capacitive pads layer 666*a* to capacitively ground from the grounding layer 676 and cease capacitively sensing touch input. In yet another example embodiment, the capacitive sensor microcontroller 670 may execute machine readable code instructions of capacitive sensor driver 668 firmware to directly connect the grounding layer 676 to the top capacitive pads layer 666*a*, via a switch, transistor, or other switching device, causing the capacitive sensing fields of the top capacitive pads layer 666*a* to ground and cease capacitively sensing touch input.

The capacitive sensor microprocessor in an embodiment at block 812 may execute machine readable code instructions of capacitive touch firmware to match voltages at a side shielding pad of a base chassis side active shielding layer and a side capacitive sensor pad of a base chassis side capacitive pads layer to extend the sensing range of the side capacitive sensor pad to sense touch input at a base chassis sidewall touch input surface. When the clamshell chassis is in the closed position, it may be desirable to increase sensitivity of the side capacitive pads layer 666*b* in order to sense both touch input and gesture input a short distance to the side of the base chassis sidewall touch input surface 603. The capacitive sensor microprocessor 670 in such an embodiment may execute machine readable code instructions of the capacitive sensor driver 668 firmware to match voltages at a side shielding pad of a base chassis side active shielding layer 674*b* and a side capacitive sensor pad of a base chassis side capacitive pads layer 666*b* to extend the sensing range of the side capacitive sensor pad to sense touch input beside and not in contact with the base chassis sidewall touch input surface 603.

At block 814, the capacitive sensor microprocessor in some embodiments may execute machine readable code instructions of strain gauge firmware to detect deflection of display chassis exterior surface under downward force applied by user as an input gesture when the clamshell chassis has the display lid chassis in a closed position relative to the base chassis. This may allow operation or activation of the top capacitive pads layer under a base chassis exterior touch input top surface to detect touch inputs on the back of the closed display lid chassis in some embodiments.

As described in embodiments with respect to FIGS. 3A and 3C, machine readable code instructions of a capacitive sensor driver executes on the capacitive sensor microprocessor to process various types of user input via the base chassis exterior touch input top surface (e.g., 364 of FIG. 3), as characterized by one or more detected capacitive change levels and characterized by location or movement across locations in the network of capacitive sensor pads, as IO input from the user for the hardware processor of the information handling system. If the detected capacitive change is at a first capacitive change level, the capacitive sensor driver may relay the sensed change from the capacitive sensor microprocessor to the hardware processor for processing of a single tap or touch as input to software or firmware applications executing on the information handling system. Similarly, a second level of capacitive change or detection across plural capacitive sensor pads of the presence of motion from the touch input or touchless gesture input of a human finger at one or more capacitive sensor pads may indicate a touchless gesture input above the base chassis exterior touch input top surface 364 such that the capacitive sensor microprocessor executing the capacitive sensor driver may determine a gesture of the user in some embodiments. In an example embodiment, the second level of capacitive change may be lower or less than the first level of capacitive change associated with a touch or tap. Even if the user touches the IO device touch input region 389 in an embodiment, the capacitive sensor pads of the base chassis exterior touch input top surface may register such a touch as the second level of capacitive change, normally associated with a gesture rather than a touch, due to the distance between the base chassis exterior touch input top surface housing the capacitive sensor pads and the IO device touch input region 389. In such a case, receiving an indication from a strain gauge disposed beneath the IO device touch input region 389 that the user has provided downward force within that region 389 when the display chassis lid is in a closed position may allow the lid position based input location mapping engine to identify the detected second capacitance change as a touch on a touch input region for a back surface of the display chassis lid rather than a gesture.

Following detection of user touch input at the base chassis exterior touch input top surface, base chassis sidewall touch input surface, or display chassis top surface, the capacitive sensor microprocessor in an embodiment at block 816 may execute machine readable code instructions of the capacitive sensor drivers and the lid position based input location mapping engine to associate user input detected one or more side capacitive sensor pads or top capacitive sensor pads, as well as at any strain gauge, with user touch inputs or touchless gesture inputs for control of various input/output (IO) devices, or functional controls for software applications or firmware executing on the information handling system. The determination of a user touch input or touchless gesture input as corresponding to one or more functional input commands for IO device, software applications, or firmware may be based on proximity of detecting top capacitive sensor pad or detecting side capacitive sensor pad to icons for those IO devices printed on the clamshell chassis, or to a visually clear location of IO device within the clamshell chassis with respect to the sensing capacitive sensor pads.

For example, the capacitive sensor microprocessor in an embodiment described with respect to FIG. 3A may execute machine readable code instructions to associate user input detected at one or more top capacitive sensor pads situated beneath the microphone touch input regions 383*a* and 384*a* with user touch or gesture input for control of the microphones, based on proximity of detecting top capacitive sensor pads to the microphone touch input regions 383*a* and 384*a* under icons for microphones printed on the clamshell chassis, or on known location of the microphones within the clamshell chassis with respect to the sensing capacitive sensor pads. As another example, the capacitive sensor microprocessor in an embodiment may execute machine readable code instructions to associate user input detected at one or more top capacitive sensor pads situated beneath the speaker touch input region 381 with user touch or gesture input for control of the speaker, based on proximity of detecting top capacitive sensor pads to the speaker touch input region 381 under an icon for the speaker printed on the clamshell chassis, or on a known location of the speaker within the clamshell chassis with respect to the sensing capacitive sensor pads. In still another example, the capacitive sensor microprocessor in an embodiment may execute machine readable code instructions to associate user input detected at one or more top capacitive sensor pads situated beneath the display touch input region 386 with user touch or gesture input for control of the digital display, based on proximity of detecting top capacitive sensor pads to the display touch input region 386 under an icon for the display printed on the clamshell chassis, or on a known location of the display within the clamshell chassis with respect to the sensing capacitive sensor pads.

In another example embodiment, the capacitive sensor microprocessor may execute machine readable code instructions to associate user input detected at one or more top capacitive sensor pads situated beneath the antenna touch input region 385*a* with user touch or gesture input for control of the wireless antenna, based on proximity of detecting top capacitive sensor pads to the antenna touch input region 385*a* under an icon for the antenna printed on the clamshell chassis, or on a known location of the antenna within the clamshell chassis with respect to the sensing capacitive sensor pads. In yet another example, the capacitive sensor microprocessor in an embodiment may execute machine readable code instructions to associate user input detected at one or more top capacitive sensor pads situated beneath the trackpad touch input regions 382*a* and 387*a* with user touch or gesture input for control of the trackpad, based on proximity of detecting top capacitive sensor pads to the trackpad touch input regions 382*a* and 387*a* on known location of the trackpad within the clamshell chassis with respect to the sensing capacitive sensor pads.

In yet another example embodiment described with respect to FIG. 3B, the capacitive sensor microprocessor in an embodiment may execute machine readable code instructions to associate user input detected at one or more side capacitive sensor pads situated beside and internal to the speaker touch input region 381 with user touch or gesture input for control of the speaker, based on proximity of detecting side capacitive sensor pads to the speaker touch input region 381 under an icon for the speaker printed on the clamshell chassis, or on a known location of the speaker within the clamshell chassis with respect to the sensing capacitive sensor pads. As another example, the capacitive sensor microprocessor in an embodiment may execute machine readable code instructions to associate user input detected at one or more side capacitive sensor pads situated beside and internal to the microphone touch input region 384*b* with user touch or gesture input for control of the microphone, based on proximity of detecting side capacitive sensor pads to the microphone touch input region 384*b* under an icon for the microphone printed on the clamshell chassis, or on a known location of the microphone within the clamshell chassis with respect to the sensing capacitive sensor pads. In yet another example, the capacitive sensor microprocessor in an embodiment may execute machine readable code instructions to associate user input detected at one or more side capacitive sensor pads situated beside and internal to the antenna touch input region 385*b* with user touch or gesture input for control of the antenna, based on proximity of detecting side capacitive sensor pads to the antenna touch input region 385*b* under an icon for the antenna printed on the clamshell chassis, or on a known location of the antenna within the clamshell chassis with respect to the sensing capacitive sensor pads. In still another example, the capacitive sensor microprocessor in an embodiment may execute machine readable code instructions to associate user input detected at one or more side capacitive sensor pads situated beside and internal to the trackpad touch input region 387*b* with user touch or gesture input for control of the trackpad, based on proximity of detecting side capacitive sensor pads to the trackpad touch input region 387*b* under an icon for the trackpad printed on the clamshell chassis, or on a known location of the trackpad within the clamshell chassis with respect to the sensing capacitive sensor pads.

At block 818, firmware for an IO device may execute the IO device command associated with the identified user touch or gesture input. For example, in an embodiment described with respect to FIG. 3A in which a detected user input comprises user touch input or user touchless gesture input within the microphone touch input region 383*a* or 384*a*, firmware for the microphone may execute an IO device command to mute or unmute the microphone or adjust volume of the microphone. In another example, in an embodiment in which a detected user input comprises user touch input or user touchless gesture input within the speaker touch input region 381, firmware for the speaker may execute an IO device command to increase or decrease volume for the speaker. In yet another example, in an embodiment in which a detected user input comprises user touch input or user touchless gesture input within the display touch input region 386, firmware for the display may execute an IO device command to increase or decrease brightness for the display. In still another example, in an embodiment in which a detected user input comprises user touch input or user touchless gesture input within the antenna touch input region 385*a*, firmware for the antenna may execute an IO device command to activate or deactivate the antenna. In still another example, in an embodiment in which a detected user input comprises user touch input or user touchless gesture input within the trackpad touch input region 382*a* or 387*a*, firmware for the trackpad may execute an IO device command to click or move a cursor.

In another example embodiment described with respect to FIG. 3B, in which a detected user input comprises user touch input or user touchless gesture input within the microphone touch input region 384*b*, firmware for the microphone may execute an IO device command to mute or unmute the microphone or a swiping touch input to adjust volume of the microphone. In another example, in an embodiment in which a detected user input comprises user touch input or user touchless gesture input within the speaker touch input region 381, firmware for the speaker may execute an IO device command to increase or decrease volume for the speaker. In still another example, in an embodiment in which a detected user input comprises user touch input or user touchless gesture input within the antenna touch input region 385*b*, firmware for the antenna may execute an IO device command to activate or deactivate the antenna. In still another example, in an embodiment in which a detected user input comprises user touch input or user touchless gesture input within the trackpad touch input region 387*b*, firmware for the trackpad may execute an IO device command to click or move a cursor.

It may be determined at block 820 whether the information handling system is still powered on. If the information handling system is not powered on, the method 800 may then end. If the information handling system is still powered on, the method may proceed back to block 804 to determine whether the clamshell chassis has moved from an open to a closed position, or vice versa. By repeating the loop between blocks 804 and 820 in such a way, the lid position based input location mapping engine, via a capacitive sensor microprocessor executing machine readable code instructions may activate or deactivate capacitive sensor pads at either the base chassis exterior touch input top surface or the base chassis sidewall touch input surface based on a configurational position (e.g., open or closed) of the clamshell chassis to control which user touch inputs may be detected when the chassis is in a closed position and when the chassis is in an open position.

The blocks of the flow diagrams of FIGS. 7 and 8 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system in a clamshell chassis having plural chassis touch input sensing hardware structures to capacitively detect a user interaction as user input comprising:

a hardware processor, a data storage device, and a power management unit (PMU) to provide power to the hardware processor and data storage device disposed in a base chassis portion of the clamshell chassis;

a first chassis touch input sensing hardware structure including a top capacitive sensor pad in a top capacitive pads layer formed under a base chassis exterior touch input top surface of the base chassis with a grounding layer and a top active shielding layer between the top capacitive sensor pad and the grounding layer;

a second chassis touch input sensing hardware structure including a side capacitive sensor pad in a side capacitive pads layer formed interior to a base chassis sidewall touch input surface of the base chassis with the grounding layer and a side active shielding layer between the side capacitive sensor pad and the grounding layer, wherein the top capacitive pads layer and the side capacitive pads layer are operably coupled to a capacitive sensor microprocessor;

a chassis positional configuration sensor to detect that a display chassis of the clamshell chassis housing a digital display device is in an open configuration;

the capacitive sensor microprocessor configured to disable the side capacitive sensor pad as a function of lid position to cease detecting capacitive changes from the user interaction with the base chassis sidewall touch input surface and to detect a capacitive change from the user interaction with a base chassis exterior touch input top surface situated above the top capacitive sensor pad to associate the detected capacitive changes with an input/output (IO) command for an IO device situated beneath the top capacitive sensor pad in the base chassis; and the hardware processor to execute the IO command to direct a functionality of the IO device.

2. The information handling system of claim 1 further comprising: the capacitive sensor microprocessor configured to operate the side active shielding layer as a grounding element to disable a plurality of side capacitive sensor pads of the side capacitive pads layer by reducing voltage to side active shielding pads of the side active shielding layer such that the side active shielding pads stop shielding parasitic capacitance grounding of the side capacitive pads layer to the grounding layer, thereby reducing the capacitive sensing field of the side capacitive pads layer from capacitively detecting the user interaction.

3. The information handling system of claim 1 further comprising: the capacitive sensor microprocessor configured to place the side active shielding layer in a high impedance state to disable a plurality of side capacitive sensor pads of the side capacitive pads layer by maximizing impedance and reducing voltage to side active shielding pads of the side active shielding layer such that the side active shielding pads stop shielding parasitic capacitance grounding of the side capacitive pads layer to the grounding layer, thereby reducing the capacitive sensing field of the side capacitive pads layer from capacitively detecting the user interaction.

4. The information handling system of claim 1 further comprising: the capacitive sensor microprocessor configured to disable a plurality of side capacitive sensor pads of the side capacitive pads layer by switching side active shielding pads of the side active shielding layer to a ground source such that the side active shielding pads cause parasitic capacitance grounding of the side capacitive pads layer to the grounded side active shielding layer thereby reducing the capacitive sensing field of the side capacitive pads layer from capacitively detecting the user interaction.

5. The information handling system of claim 1 further comprising: the chassis positional configuration sensor to detect that the display chassis of the clamshell chassis is in a closed configuration; and the capacitive sensor microprocessor configured to disable the top capacitive sensor pad to cease detecting capacitive changes from the user interaction with the base chassis exterior touch input top surface and to detect a capacitive change from the user interaction with the base chassis sidewall touch input surface situated exterior to the side capacitive sensor pad to associate the detected capacitive changes with the input/output (IO) command for the IO device situated internal to the side capacitive sensor pad in the base chassis.

6. The information handling system of claim 1, wherein the user interaction with the base chassis exterior touch input top surface is the user touching a finger at a portion of the base chassis exterior touch input top surface that is co-located with the IO device to power the IO device on or off.

7. The information handling system of claim 1, wherein the top capacitive sensor pad is a carbon-based conductive deposit on a first chassis touch input sensing hardware structure substrate installed under the base chassis exterior touch input top surface and the side capacitive sensor pad is a carbon based conductive deposit on a second chassis touch input sensing hardware structure substrate installed interior to the base chassis sidewall input surface.

8. A method of orchestrating operation of plural touch input sensing hardware structures of an information handling system with a clamshell chassis to detect a user interaction based on chassis orientation comprising:

detecting, via a chassis positional configuration sensor, that a display chassis is in a closed configuration relative to a base chassis of the clamshell chassis;

placing a top shielding layer internal to a top capacitive pads layer at a first chassis touch input sensing hardware structure formed under a base chassis exterior touch input top surface of the base chassis in a predefined ground state or a high impedance state, via a capacitive sensor microprocessor configured to minimize voltage at or switching to ground the top shielding layer and to reduce a capacitive sensing field of a plurality of top capacitive sensor pads of the top capacitive pads layer;

detecting user touch inputs of a user interaction via capacitive change level detected at a side capacitive pads layer having a plurality of side capacitive sensor pads of a second chassis touch input sensing hardware structure and formed interior to a base chassis sidewall input surface via a capacitive sensor microprocessor when the clamshell chassis is in the closed configuration;

associating, via the capacitive sensor microprocessor configured of a capacitive sensor driver, the detected capacitive change level from at least one side capacitive sensor pad with an input/output (IO) command for an IO device situated internal to the at least one side capacitive sensor pad; and directing functionality of the IO device, via a hardware processor executing the IO command.

9. The method of claim 8 further comprising: receiving input, via the capacitive sensor microprocessor configured of a capacitive sensor driver operatively coupled to the side capacitive pads layer from the plurality of side capacitive sensor pads to detect changes in capacitance levels without physical contact by the user at the base chassis sidewall touch input surface.

10. The method of claim 8 further comprising: placing a side active shielding layer of the second chassis touch input sensing hardware structure internal to the base chassis sidewall touch input surface in a predefined ground state or a high impedance state, via a capacitive sensor microprocessor configured to minimize voltage at or switching to ground the side shielding layer when the clamshell chassis is in the open configuration, to reduce the capacitive sensing field of the plurality of side capacitive sensor pads of the side capacitive pads layer; and detecting user touch inputs of the user interaction via capacitive change level detected at top capacitive pads layer having the plurality of top capacitive sensor pads of the first chassis touch input sensing hardware structure formed under the base chassis exterior touch input top surface via the capacitive sensor microprocessor configured of the capacitive sensor driver firmware to place the first active shielding layer in a shield state by providing voltage to the first active shielding layer.

11. The method of claim 10, wherein the IO device is a trackpad and the user interaction with the base chassis exterior touch input top surface is the user touching a finger at a portion of the base chassis exterior touch input top surface nearest the trackpad to move a cursor.

12. The method of claim 8, wherein the IO device is a speaker and the user interaction with the base chassis sidewall touch input surface is the user swiping a finger across a portion of the base chassis sidewall situated nearest the microphone to adjust volume of the microphone.

13. The method of claim 8 further comprising: receiving input, via the capacitive sensor microprocessor configured of a capacitive sensor driver operatively coupled to the side capacitive pads layer and from the plurality of side capacitive sensor pads as detected changes in capacitance levels for a touchless gesture input without physical contact by the user at the base chassis sidewall touch input surface.

14. The method of claim 8, wherein the plurality of top capacitive sensor pads are carbon-based conductive deposits on a first chassis touch input sensing hardware structure substrate installed under the base chassis exterior touch input top surface and the plurality of side capacitive sensor pads are carbon based conductive deposits on a second chassis touch input sensing hardware structure substrate installed interior to the base chassis sidewall input surface.

15. An information handling system in a clamshell chassis having a chassis touch input sensing hardware structure to capacitively detect a user interaction as user input comprising:

a hardware processor, a data storage device, and a power management unit (PMU) to provide power to the hardware processor and data storage device disposed in a base chassis portion of the clamshell chassis;

a chassis touch input sensing hardware structure including a top capacitive sensor pad in a top capacitive pads layer formed under a base chassis exterior touch input top surface of the base chassis with a grounding layer and a top active shielding layer between the top capacitive sensor pad and the grounding layer and including a side capacitive sensor pad in a side capacitive pads layer formed interior to a base chassis sidewall touch input surface of the base chassis with the grounding layer and a side active shielding layer between the side capacitive sensor pad and the grounding layer, wherein the top capacitive pads layer and the side capacitive pads layer are operably coupled to a capacitive sensor microprocessor;

the capacitive sensor microprocessor configured to disable the side capacitive sensor pad to cease detecting capacitive changes from the user interaction with the base chassis sidewall touch input surface and to detect a first capacitive change level from the user interaction with a base chassis exterior touch input top surface situated above the top capacitive sensor pad to identify a first input/output (IO) command associated with the first capacitive change when a chassis positional configuration sensor detects that a display chassis of the clamshell chassis is in an open configuration relative to the base chassis; the capacitive sensor microprocessor configured to disable the top capacitive sensor pad to cease detecting capacitive changes from the user interaction with the base chassis exterior touch input top surface and to detect a second capacitive change level from the user interaction with the base chassis sidewall touch input surface situated internal to the side capacitive sensor pad to identify a second input/output (IO) command associated with the second capacitive change when the chassis positional configuration sensor detects that the display chassis of the clamshell chassis is in a closed configuration relative to the base chassis; and the hardware processor to execute the first IO command to direct a functionality of a first IO device when the clamshell chassis is in the open configuration and to execute the second IO command to direct the functionality of the first IO device when the clamshell chassis is in the closed configuration.

16. The information handling system of claim 15 further comprising: the capacitive sensor microprocessor configured to operate the top active shielding layer as a grounding element to disable a plurality of top capacitive sensor pads of the side capacitive pads layer by reducing voltage to top active shielding pads of the top active shielding layer such that the top active shielding pads stop shielding parasitic capacitance grounding of the top capacitive pads layer to the grounding layer, thereby reducing the capacitive sensing field of the top capacitive pads layer from capacitively detecting the user interaction.

17. The information handling system of claim 15 further comprising: the capacitive sensor microprocessor configured to operate the side active shielding layer as a grounding element to disable a plurality of side capacitive sensor pads of the side capacitive pads layer by reducing voltage to side active shielding pads of the side active shielding layer such that the side active shielding pads stop shielding parasitic capacitance grounding of the side capacitive pads layer to the grounding layer, thereby reducing the capacitive sensing field of the side capacitive pads layer from capacitively detecting the user interaction.

18. The information handling system of claim 15, wherein the user interaction with the base chassis sidewall touch input surface is the user swiping a finger across a sidewall exterior surface portion of the base chassis that is at least partially co-located with the first IO device to adjust functionality of the first IO device.

19. The information handling system of claim 15, wherein the user interaction the base chassis exterior touch input top surface is the user swiping a finger across a top exterior surface portion of the base chassis that is at least partially co-located with the first IO device to adjust functionality of the first IO device.

20. The information handling system of claim 15, wherein the IO device is the digital display device and the user interaction with the base chassis exterior touch input top surface is the user swiping a finger across a top exterior surface portion of the base chassis co-located with an icon for the digital display device along a hinge with the display chassis to adjust brightness of the digital display device.

* * * * *